（12）United States Patent
Stabrawa et al.

(10) Patent No.: US 10,372,335 B2
(45) Date of Patent: *Aug. 6, 2019

(54) EXTERNAL MEMORY FOR VIRTUALIZATION

(71) Applicant: KOVE IP, LLC, Chicago, IL (US)

(72) Inventors: Timothy A. Stabrawa, Lombard, IL (US); Zachary A. Cornelius, Chicago, IL (US); Curtis R. Smith, Westminster, MD (US); John Overton, Chicago, IL (US); Andrew S. Poling, Lombard, IL (US); Jesse I. Taylor, Glenside, PA (US)

(73) Assignee: KOVE IP, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/424,395

(22) Filed: Feb. 3, 2017

(65) Prior Publication Data

US 2017/0147227 A1    May 25, 2017

Related U.S. Application Data

(63) Continuation-in-part of application No. 14/530,908, filed on Nov. 3, 2014, now Pat. No. 9,626,108, and a
(Continued)

(51) Int. Cl.
*G06F 3/06* (2006.01)
*G06F 12/08* (2016.01)
(Continued)

(52) U.S. Cl.
CPC .......... *G06F 3/0608* (2013.01); *G06F 3/0604* (2013.01); *G06F 3/065* (2013.01);
(Continued)

(58) Field of Classification Search
CPC ................. G06F 2212/264; G06F 12/0223
See application file for complete search history.

(56) References Cited

U.S. PATENT DOCUMENTS 6,049,853 A   4/2000 Kingsbury et al.
7,925,711 B1  4/2011 Gopalan et al.
(Continued)

FOREIGN PATENT DOCUMENTS

WO    WO 2008/132760 A2    11/2008

OTHER PUBLICATIONS

Office Action, dated Oct. 23, 2017, pp. 1-13, U.S. Appl. No. 14/854,657, U.S. Patent and Trademark Office, Alexandria, VA.
(Continued)

*Primary Examiner* — Gary W. Cygiel
(74) *Attorney, Agent, or Firm* — Brinks Gilson & Lione

(57) ABSTRACT

Methods and systems for providing a virtualization instance on an apparatus access to external primary memory, where the external primary memory is memory that is external to the apparatus but primary memory to the apparatus. Methods and systems to migrate a virtualization instance from a first client to a second client are provided in which memory of the virtualization instance is copied to from a first region to a second region without being copied to or from the first client or the second client. Methods and systems are provided for limiting local primary memory usage by a virtualization instance. After the flushing or the shooting down a translation lookaside buffer, a selected memory portion corresponding to a page table entry is marked dirty based on a portion-tracking data structure indicating that the page table entry for the selected memory portion was dirty when the selected memory portion was unmapped.

23 Claims, 11 Drawing Sheets

Related U.S. Application Data continuation-in-part of application No. 14/854,657, filed on Sep. 15, 2015, which is a continuation-in-part of application No. 14/530,908, application No. 15/424,395, which is a continuation-in-part of application No. 15/076,561, filed on Mar. 21, 2016, now Pat. No. 9,916,095.

(60) Provisional application No. 62/291,914, filed on Feb. 5, 2016, provisional application No. 62/051,144, filed on Sep. 16, 2014, provisional application No. 62/139,310, filed on Mar. 27, 2015.

(51) Int. Cl.
*G06F 12/10* (2016.01)
*H04L 29/08* (2006.01)

(52) U.S. Cl.
CPC ............ *G06F 3/067* (2013.01); *G06F 3/0607* (2013.01); *G06F 3/0619* (2013.01); *G06F 3/0631* (2013.01); *G06F 3/0647* (2013.01); *G06F 3/0667* (2013.01); *G06F 3/0683* (2013.01); *G06F 12/08* (2013.01); *H04L 67/1097* (2013.01); *G06F 12/10* (2013.01); *G06F 2212/1048* (2013.01); *G06F 2212/152* (2013.01); *G06F 2212/154* (2013.01)

(56) References Cited

U.S. PATENT DOCUMENTS

| | | |
|---|---|---|
| 8,307,154 B2 | 11/2012 | Stabrawa et al. |
| 8,745,276 B2 | 6/2014 | Bloch et al. |
| 8,775,755 B2 | 7/2014 | Magenheimer et al. |
| 8,799,914 B1 | 8/2014 | Metcalf |
| 8,914,458 B2 | 12/2014 | Raindel et al. |
| 9,015,426 B2 | 4/2015 | Stabrawa et al. |
| 9,575,889 B2 | 2/2017 | Chang et al. |
| 2003/0188114 A1 | 10/2003 | Lubbers et al. |
| 2004/0093389 A1 | 5/2004 | Mohamed et al. |
| 2004/0143562 A1 | 7/2004 | Chen et al. |
| 2004/0143718 A1 | 7/2004 | Chen et al. |
| 2004/0221102 A1 | 11/2004 | Watanabe |
| 2005/0044301 A1 | 2/2005 | Vasilevsky et al. |
| 2005/0204045 A1 | 9/2005 | Belkin et al. |
| 2006/0236063 A1 | 10/2006 | Hausauer et al. |
| 2008/0104337 A1 | 5/2008 | VelurEunni |
| 2008/0235409 A1 | 9/2008 | Ryzhykh |
| 2009/0113425 A1 | 4/2009 | Ports et al. |
| 2012/0221803 A1 | 8/2012 | Stabrawa et al. |
| 2012/0222052 A1 | 8/2012 | Magenheimer et al. |
| 2013/0185720 A1 | 7/2013 | Tuch et al. |
| 2013/0290546 A1 | 10/2013 | Samih et al. |
| 2014/0089451 A1 | 3/2014 | Eran et al. |
| 2014/0164545 A1 | 6/2014 | David et al. |
| 2015/0020071 A1 | 1/2015 | Phelan et al. |
| 2015/0293881 A1 | 10/2015 | Raikin et al. |
| 2016/0019117 A1* | 1/2016 | Kumarasamy ...... G06F 11/1417 707/650 |
| 2016/0077761 A1 | 3/2016 | Stabrawa et al. |
| 2016/0077966 A1 | 3/2016 | Stabrawa et al. |
| 2016/0077975 A1 | 3/2016 | Stabrawa et al. |

OTHER PUBLICATIONS

Office Action, dated Jun. 29, 2017, pp. 1-13, U.S. Appl. No. 15/621,537, U.S. Patent and Trademark Office, Alexandria, VA.
Office Action, dated Jul. 5, 2016, pp. 1-20, U.S. Appl. No. 14/530,908, U.S. Patent and Trademark Office, Alexandria, VA.
Office Action, dated Jan. 11, 2017, pp. 1-6, U.S. Appl. No. 14/554,655, U.S. Patent and Trademark Office, Alexandria, VA.
Al-Moayed, A., "Quality of Service Attributes in Web Services," dated 2010, pp. 367-372, 2010 Fifth International Conference on Software Engineering Advances, © 2010 IEEE.
Anonymous, "Implementing calloc( )", dated Apr. 12, 2010, pp. 1-3, available at http://web.archive.org/web/20100412183814/http://locklessinc.com/articles/calloc/.
Anonymous, "Remote direct memory access," dated Dec. 30, 2014, pp. 1-2, XP055288069, Retrieved from the Internet at URL: https://en.wikipedia.org/w/index.php?title=Remote_direct_memory_access&oldid=640243457.
Anonymous, "Copy-on-write," dated Nov. 26, 2014, pp. 1-3, XP055288087, Retrieved from the Internet at URL: https://en.wikipedia.org/w/index.php?title=Copy-on-write&oldid=635508753.
Brian Van Essen et al., "DI-MMAP—a scalable memory-map runtime for out-of-core data-intensive applications", dated Oct. 4, 2013, pp. 15-28, Cluster Computing, vol. 18, Issue 1, Springer US.
Chao Wang et al., "NVMalloc: Exposing an Aggregate SSD as a Memory Partition in Extreme-Scale Machines", dated 2012, pp. 957-968, *Parallel & Distributed Processing Symposium (IPDPS)*, 2012 IEEE 26th International, Shanghai.
Hannes Mühleisen et al., "Peak Performance—Remote Memory Revisited," dated Jun. 24, 2013, pp. 1-7, DaMoN' 13, New York, NY.
"Hugetlbpage", dated Sep. 13, 2015, pp. 1-6, The Linux Kernel Archives, https://www.kernel.org/doc/Documentation/vm/hugetlbpage.txt.
Iulian Moraru, "nvmalloc", dated Feb. 27, 2013, p. 1, GitHub, https://github.com/efficient/nvram/tree/master/nvmalloc.
Katnegermis, "rdma/rdma_common.c at master . katnegermis/rdma . GitHub", dated Apr. 27, 2014, pp. 1-4, available at https://github.com/katnegermis/rdma/blob/master/rdma_common.c.
Katnegermis, "rdma/rdma_server.c at master . katnegermis/rdma . GitHub", dated May 6, 2014, pp. 1-7, available at http://github.com/katnegermis/rdma/blob/master/rdma_server.c.
Kevin Te-Ming Lim, "Disaggregated Memory Architectures for Blade Servers," dated 2010, pp. 1-148, The University of Michigan, Ann Arbor, MI.
Konstantinos Karampogias, "An In-Memory RDMA-Based Architecture for the Hadoop Distributed Filesystem Master Thesis," dated Aug. 21, 2012, pp. 25-31, ftp://ftp.tik.ee.ethz.ch/pub/students/2012-FS/MA-2012-04.pdf.
Liran Liss, "On Demand Paging for User-level Networking", dated Sep. 30, 2013, pp. 1-25, Mellanox Technologies.
Liran Liss, "On-Demand-Paging (ODP) Update", dated Apr. 28, 2014, available at https://www.youtube.com/watch?v=KbrlsXQbHCw.
"Remote direct memory access", dated May 12, 2016, pp. 1-2, Wikipedia, https://en.wikipedia.org/wiki/Remote_direct_memory_access.
Robert Russell, "Introduction to RDMA Programming", dated Apr. 17, 2014, pp. 1-76, available at http://web.archive.org/web/20140417205540/http://www.cs.unh.edu/~rdr/rdma-intro-module.ppt.
Shuang Liang et al., "Swapping to Remote Memory over InfiniBand: An Approach using a High Performance Network Block Device," dated Sep. 2005, pp. 1-10, The Ohio State University, Columbus, OH.
Shuang Liang et al. "Swapping to Remote Memory over InfiniBand: An Approach using a High Performance Network Block Device," dated Sep. 2005, pp. 1-30, Cluster Computing, 2005. IEEE International, Conference located in Burlington, MA.
Stephen Mathew Rumble, "Memory and Object Management in RAMCloud," dated Mar. 2014, pp. 1-161, Stanford University, Stanford, CA.
Dall, C., et al., "KVM/ARM: The Design and Implementation of the Linux ARM Hypervisor," dated Mar. 1, 2014, pp. 333-347, *ASPLOS* '14, Mar. 1-4, 2014, Salt Lake City, UT, Copyright is held by the owner/author(s). Publication rights licensed to ACM. ACM 971-1-4503-3205-5/14/03.
Van Essen, B., et al., "DI-MMAP—a scalable memory-map runtime for out-of-core data-intensive applications," dated Oct. 4, 2013, pp. 15-28, Cluster Comput (2015) 18:15-28, DOI 10.01007/s10586-013-0309-0, © The Authors 2013. Published with open access at Springerlink.com.

(56) References Cited

OTHER PUBLICATIONS

Kivity, Avi, "kvm: the Linux Virtual Machine Monitor," dated Jun. 27, 2007, pp. 225-232, Proceedings of the Linux Symposium, vol. 1, Jun. 27-30, 2007, Ottawa, Ontario, Canada.

Triplett, Josh, "Using the KVM API," dated Sep. 29, 2015, pp. 1-12, available at URL: https://lwn.net/Articles/658511.

Sorensen, J., "KVM Live Snapshot support," dated Jun. 1, 2011, pp. 1-22, LinuxCon Japan, Jun. 1, 2011.

"Warning: The xenpaging code is new and not fully debugged . . . ", retrieved Jan. 27, 2016, at URL: http://xenbits.xen.org/docs/4.3-testing/misc/xenpaging.txt.

International Search Report, dated Dec. 8, 2015, pp. 1-14, International Application No. PCT/US2015/050170, European Patent Office, Rijswijk, Netherlands.

Partial International Search Report, dated Dec. 17, 2015, pp. 1-8, International Application No. PCT/US2015/050177, European Patent Office, Rijswijk, Netherlands.

International Search Report, dated May 4, 2016, pp. 1-28, International Application No. PCT/US2015/050177, European Patent Office, Rijswijk, Netherlands.

Office Action, dated Apr. 6, 2016, pp. 1-22, U.S. Appl. No. 14/554,655, Alexandria, VA.

Office Action, dated Apr. 8, 2016, pp. 1-21, U.S. Appl. No. 14/530,908, Alexandria, VA.

Office Action, dated Jul. 5, 2016, pp. 1-21, issued in U.S. Appl. No. 14/554,655, Alexandria, VA.

Extended European Search Report, dated Jul. 28, 2016, pp. 1-11, issued in European Patent Application No. 16162354.1, European Patent Office, Munich, Germany.

Van Essen, Brian, "tagged_page.c" (source code file is part of DI-MMAP, Version 1.0), dated 2012, pp. 1-13, Lawrence Livermore National Security, LLC, retrieved from https://bitbucket.org/vanessen/di-mmap/src.

Van Essen, Brian, "Snippet of 'tagged_page.c'" (source code file is part of DI-MMAP, Version 1.0), dated 2012, p. 1, Lawrence Livermore National Security, LLC, retrieved from https://bitbucket.org/vanessen/di-mmap/src.

Van Essen, Brian, "helpers.c" (source code file is part of DI-MMAP, Version 1.0), dated 2012, pp. 1-19, Lawrence Livermore National Security, LLC, retrieved from https://bitbucket.org/vanessen/di-mmap/src.

Van Essen, Brian, "Snippet of 'helpers.c'" (source code file is part of DI-MMAP, Version 1.0), dated 2012, p. 1, Lawrence Livermore National Security, LLC, retrieved from https://bitbucket.org/vanessen/di-mmap/src.

"Memory Resource Controller" (memory cgroup documentation—Kernel.org), pp. 1-23, Jan. 25, 2016, Kernel.org, retrieved from https://wvvw.kernel.org/doc/Documentation/cgroup-v1/memory.txt.

Kevin Lim et al., "Disaggregated Memory for Expansion and Sharing in Blade Servers," International Symposium on Computer Architecture, dated Jun. 24, 2009, pp. 1-12, published by ACM, Austin, TX.

Non-Final Office Action issued in corresponding U.S. Appl. No. 15/800,891, dated Apr. 2, 2018, pp. 1-14, U.S. Patent and Trademark Office, Alexandria, VA.

Final Office Action issued in corresponding U.S. Appl. No. 14/854,657, dated Apr. 5, 2018, pp. 1-13, U.S. Patent and Trademark Office, Alexandria, VA.

Aleksander Dragojević et al., FaRM: Fast Remote Memory, Proceedings of the 11$^{th}$ USENIX Symposium on Networked Systems Design and Implementation (NSDI '14), ISBN 978-1-931971-09-6, dated Apr. 2, 2014, pp. 1-15, published by USENIX Association, Seattle, WA.

European Office Action, issued in EP Application No. 15 770 761.3, dated Nov. 29, 2018, pp. 1-7, European Patent Office, Rijswijk, Netherlands.

European Office Action, issued in EP Application No. 15 782 105.9, dated Nov. 29, 2018, pp. 1-7, European Patent Office, Rijswijk, Netherlands.

* cited by examiner

EXTERNAL MEMORY FOR VIRTUALIZATION

This application is a non-provisional application of, and claims priority under 35 USC § 119(e) to, U.S. provisional patent application 62/291,914 filed Feb. 5, 2016 and entitled "EXTERNAL MEMORY FOR VIRTUALIZATION", the entire contents of which are incorporated by reference; this application is a continuation-in-part of U.S. non-provisional patent application Ser. No. 14/530,908, filed Nov. 3, 2014 and entitled "DYNAMICALLY PROVISIONABLE AND ALLOCATABLE EXTERNAL MEMORY", the entire contents of which are incorporated by reference, which is a non-provisional application of U.S. provisional patent application 62/051,144, filed Sep. 16, 2014 and entitled "DYNAMICALLY PROVISIONABLE AND ALLOCATABLE EXTERNAL MEMORY"; this application is a continuation-in-part of U.S. non-provisional patent application Ser. No. 14/854,657, filed Sep. 15, 2015 and entitled "PAGING OF EXTERNAL MEMORY", the entire contents of which are incorporated by reference, which is a continuation-in-part of U.S. non-provisional patent application Ser. No. 14/530,908, filed Nov. 3, 2014 and entitled "DYNAMICALLY PROVISIONABLE AND ALLOCATABLE EXTERNAL MEMORY"; and this application is a continuation-in-part of U.S. non-provisional patent application Ser. No. 15/076,561, filed Mar. 21, 2016, "FORK-SAFE MEMORY ALLOCATION FROM MEMORY-MAPPED FILES WITH ANONYMOUS MEMORY BEHAVIOR", the entire contents of which are incorporated by reference, which is a non-provisional application of U.S. provisional patent application 62/139,310, filed Mar. 27, 2015 and entitled "FORK-SAFE MEMORY ALLOCATION FROM MEMORY-MAPPED FILES WITH ANONYMOUS MEMORY BEHAVIOR".

TECHNICAL FIELD

This application relates to virtual machines and, in particular, to virtual machines and external memory.

BACKGROUND

In traditional virtualization systems, a user may spawn one or more virtual machines using resources of a physical machine (also known as a host machine) that is hosting the virtual machines. For example, the host machine may contain one or more central processing units (CPUs) and/or CPU cores that may be allocated to the virtual machines and/or that may be time-sliced for use by the virtual machines. The host machine may also contain a fixed amount of memory that may be allocated to the virtual machines. In a traditional virtualization system in which one or more virtual machines execute, the maximum amount of memory available to the virtual machines is limited by the architecture of the host machine and/or the amount of memory physically installed in the host machine.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
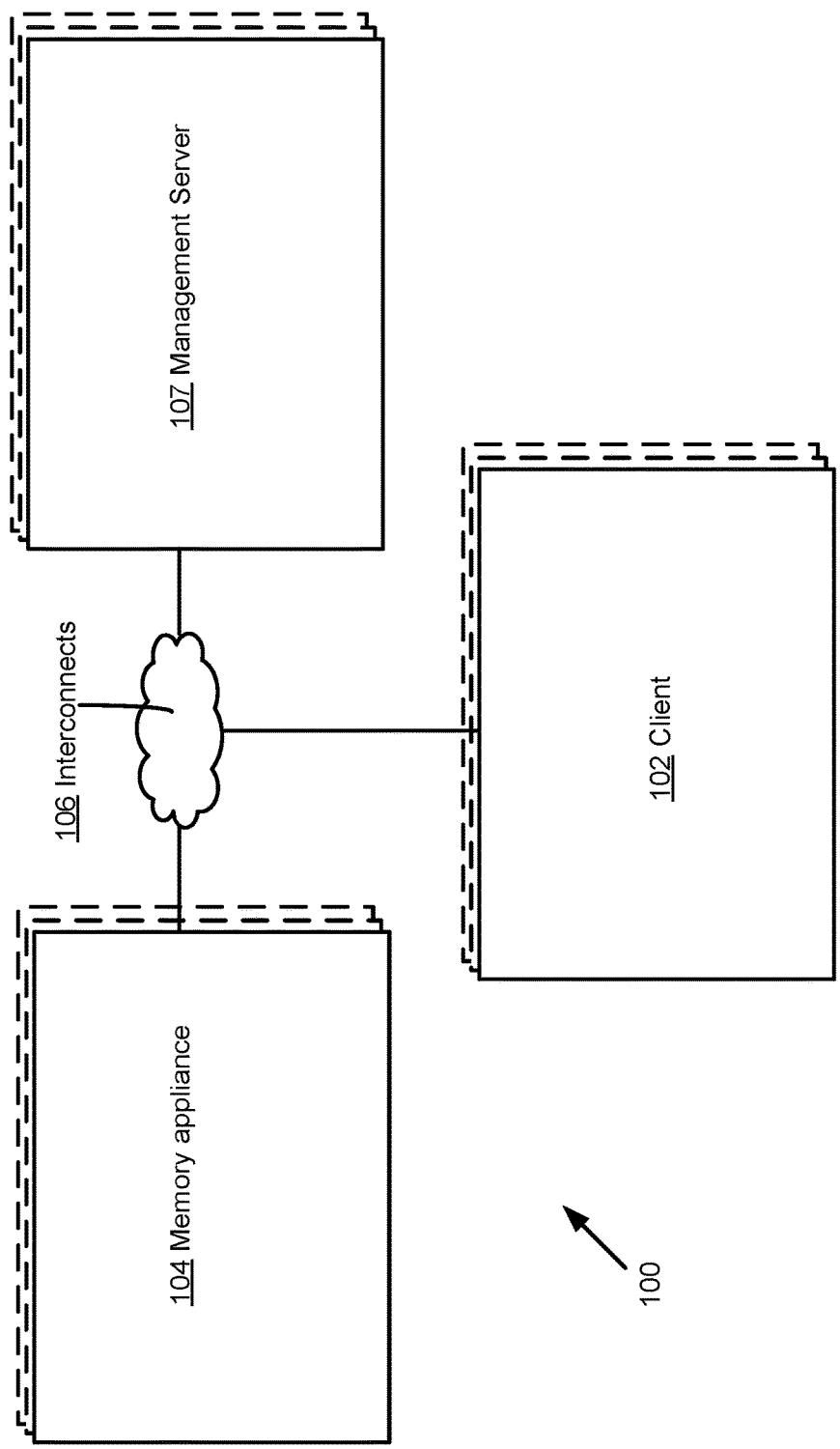
FIG. 1 illustrates a hardware diagram of an example external memory system.

FIG. 1 illustrates a hardware diagram of an example external memory system 100 for virtualization. The external memory system may include a memory appliance 104, a management server 107, a client 102, and one or more interconnects 106. The external memory system may include more, fewer, or different elements. For example, the external memory system may include multiple clients, multiple memory appliances, and/or multiple management servers. Alternatively, the external memory system may include just the client, just the memory appliance, and/or just the management server.

The memory appliance 104 may include memory that may be externally allocatable as primary memory. Henceforth, throughout this disclosure, unless specified otherwise, "memory" refers to primary memory. The management server 107 may be a memory pool manager, responsible to allocate and/or manipulate memory allocations for the client 102 using the memory appliance 104. The client 102 may be a machine or a device requesting external memory. The client 102 may contain local memory that operates as the primary memory of the client 102. However, the external memory allocation may be requested by the client to scale the capacity of the primary memory available locally. Alternatively or in addition, the client 102 may operate the locally available primary memory as a cache memory when accessing the externally allocated memory from the memory appliance 104. For example, the cache memory may be used by the client 102 to reduce average time to access data from the externally allocated memory in the memory appliance 104. The locally available primary memory of the client 102 may be faster to access than the externally allocated memory and may be used to store copies of data from frequently used memory locations of the externally allocated memory. For example, the client 102 may read data from or write data to a location in the externally allocated memory. The client 102 may first check whether a copy of the data is in the cache memory, such as the locally available memory. If so, the client 102 may read the data from or write the data to the cache memory, which may be faster than reading from or writing to the externally allocated memory.

The memory appliance 104, the management server 107, and the client 102 may communicate with each other over the one or more interconnects 106. The communication may be unidirectional or bi-directional. The one or more interconnects 106, in some examples, may electrically couple the memory appliance 104, the management server 107, and/or the client 102. Each of the interconnects 106 may include a physical component that transports signals between two or more devices. For example, each interconnect 106 may be a cable, a wire, a parallel bus, a serial bus, a network, a switched fabric, a wireless link, a point to point network, or any combination of components that transport signals between devices. Alternatively or in addition, the memory appliance 104, the management server 107, and the client 102 may communicate over a communication network, such as a switched fabric, a Storage Area Network (SAN), an InfiniBand network, a Local Area Network (LAN), a Wireless Local Area Network (WLAN), a Personal Area Network (PAN), a Wide Area Network (WAN), a circuit switched network, a packet switched network, a telecommunication network or any other now known or later developed communication network. The communication network, or simply "network", may enable a device to communicate with components of other external devices, unlike buses that only enable communication with components within and/or plugged into the device itself. Thus, a request for primary memory made by an application or any other type of application logic executing on the client 102 may be sent over the interconnect 106, such as the network. The request may be sent to one or more devices external to the client 102, such as the management server 107 and/or the memory appliances 104. In response to the request, the application that made the request may be allocated memory from memories of one or more memory appliances that are external to the client 102.

The management server 107 may dynamically allocate and/or manipulate external memory allocations for the client 102. An external memory allocation may reference one or more regions in the memory appliance 104. The management server 107 may allocate and/or manipulate the regions in the memory appliance 104 using region access logic requests. The client 102 may allocate and/or manipulate external memory allocations and/or regions using allocation logic requests.

Multiple memory appliances may be "pooled" to create a dynamically allocatable, or allocable, external memory pool. For example, new memory appliances may be discovered, or as they become available, memory of, or within, the new memory appliances may be made part of the memory pool. The memory pool may be a logical construct. The memory pool may be multiple memory appliances known to and/or associated with the management server 107. The memory appliances involved in the memory pool may or may not know about each other. As additional memory appliances are discovered, the memory of the memory appliances may be added to the memory pool, in other words, the portions of the memory of the memory appliances is made available for use by the requesting client 102. The client 102 may be able to request dynamically allocatable external memory from the memory pool which may be available for use, even though the external memory exists on other machines, unknown to the client 102. The client 102 requesting memory, at the time of requesting the memory, may be unaware of the size of the memory pool or other characteristics related to configuration of the memory pool. The memory pool may increase or decrease at any time without a service interruption of any type to the memory consumers, such as the machines requesting memory.

The external memory allocations may span multiple memory appliances. Thus, the external memory system 100 makes available memory capacity that is larger than what may fit in the requesting client 102, in a single memory appliance 104, or in a single server. The memory capacity made available may be effectively unlimited because any number of memory appliances may be part of the memory pool. The memory pool may be expanded based on various conditions being met. For example, more price-performant memory available may be selected to grow the memory pool in a more cost-efficient manner. Alternatively or in addition, memory appliances may be added at any moment to extend the capacity and performance of the aggregate pool, irrespective of characteristics of the memory appliances. In contrast, the individual client 102, such as a server computer, may be limited in physical and local memory capacity, and moreover, in order to achieve the largest memory capacity, expensive memory may have to be used or installed in the individual client 102 absent dynamically allocatable external memory.

Instead, with dynamically allocatable external memory, such as the memory pool, expensive large servers with large memory capacity may not necessarily be purchased. Instead, smaller more energy-efficient and cost-effective servers may be purchased and their memory capacity expanded, on demand, by using dynamically allocatable external memory.

The memory pool may be managed by the management server 107 in some examples. The management server 107, using various components, may provision external primary memory to the client 102 or multiple clients that request external memory allocation. The memory pool manager may provision external memory to different clients at different times according to different policies, contracts, service level agreements (SLAs), performance loads, temporary or permanent needs, and/or any other factors.

In one example, the client 102 may be a server cluster. By using external memory allocation and provisioning, the server cluster need not require all of the servers to have sufficient pre-existing local memory in order to process all anticipated loads. A typical approach to have each individual server to have full capacity memory leads to over-purchasing memory for all servers in order to satisfy exceptional cases needed by some servers, some of the time. Instead, with external memory, the server cluster may provision portions of external memory where and when needed, thereby saving money, space, and energy, by providing on-demand memory to any capacity. The server cluster may even support memory capacities impossible to physically fit into a single machine.

In another example, external memory may be dynamically allocated according to performance ratings of the external memory. For example, higher-performance external memory may be provisioned for some purposes, and/or lower-performance, but larger capacity and/or lower cost, external memory for other purposes.

The memory pool may provide dynamic memory allocation so that the client 102 may request to receive external memory, and when the external memory is no longer needed, the client 102 may release the external memory back to the memory pool. The dynamic memory allocation may enable the client 102 to allocate a provisioned amount of external memory for various purposes on the client 102 at various times, on-the-fly, according to client-logic needs rather than based on an installation policy, or local, internal memory of a particular server.

The client 102 may access the dynamically allocatable external memory through a variety of methods. The different methods to access the external memory may vary the lowest level addressing used to address the external memory. The client 102 may be provided with different interfaces for each respective access method. For example, a memory-mapped file, a physical mapping, a programmatic Application Programming Interface (API), or any other application-specific interface, may be provided to access the external memory. The multiple access methods may be employed at the same time in some examples, and/or against the same external memory allocation.

Depending upon the access method used, external memory operations may not be constrained to memory page size. For some access methods, external memory operations may be as small as a single byte or character and scale to any degree.

In an example, the dynamically allocatable external memory may enable multiple clients to share an external memory allocation. The multiple clients, in this case, may access and/or operate on the data in the shared external memory allocation at the same time. Thus, external and scalable shared memory may be provided to the multiple clients concurrently.

As described throughout this disclosure, external memory operations may be carried out via direct communication, referred to as a client-side memory access, between the client 102 and the memory appliance 104 that is part of the memory pool. The client-side memory access may provide a consistent low latency, such as 2 micro-seconds average access times. The client-side memory access may also provide determinacy, or in other words, a predictable performance, such as a determinate amount of time for a given memory operation to be performed. Thus, by using the client-side memory access, the dynamically allocatable external memory may provide a high level of determinacy and consistent performance scaling even as more memory appliances and external memory clients are deployed and/or used for dynamic load balancing, aggregation, and/or re-aggregation.

Dynamically allocatable external memory may also be persistent, meaning the data stored in the external memory is durable over time. This extends the memory paradigm to include the persistence aspects of external storage while retaining the performance of memory. This provides performance of memory with conveniences of a storage paradigm.

Figure 2:
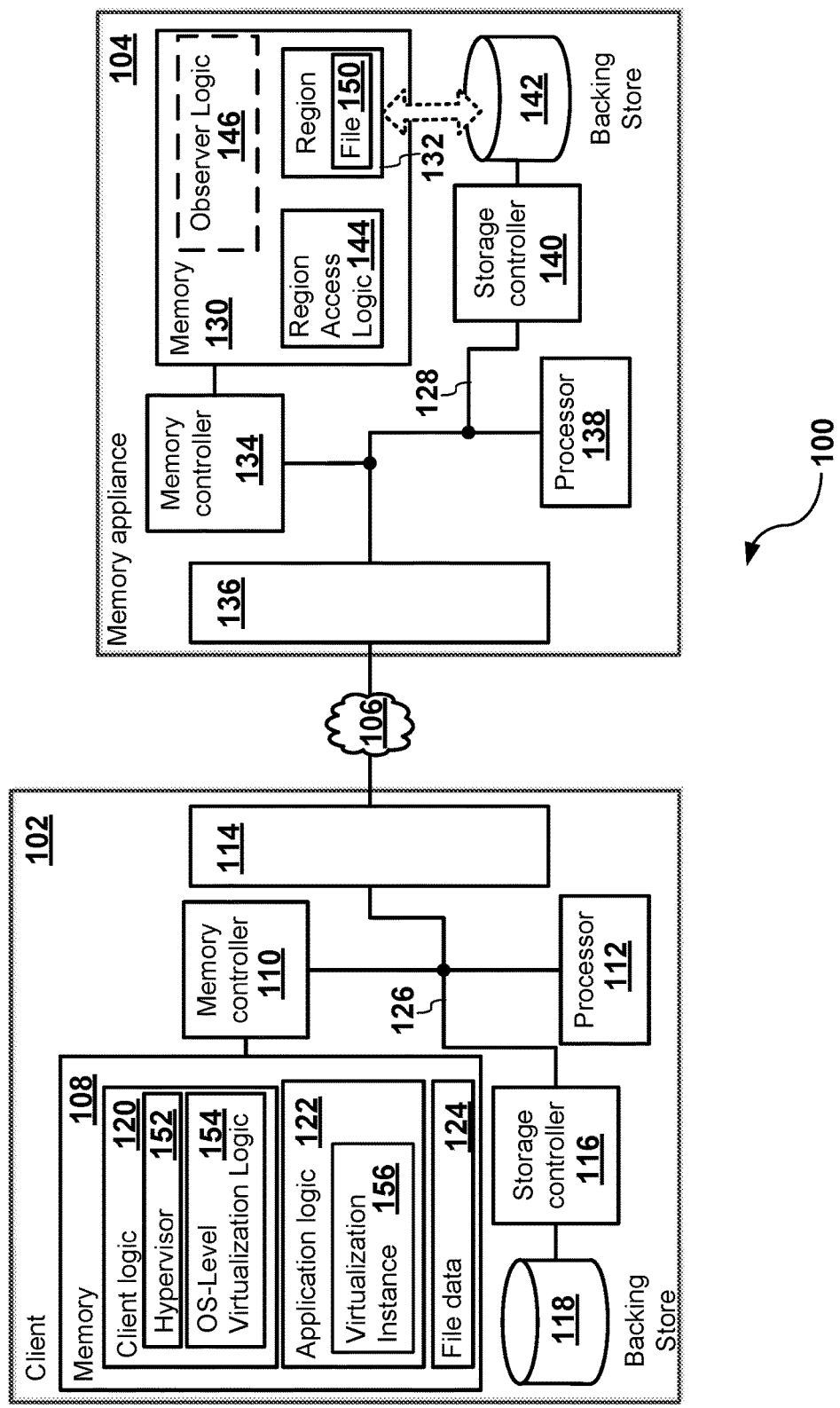
FIG. 2 illustrates an example of a system using external memory for virtualization.

FIG. 2 illustrates a first example of the system 100 using external memory for virtualization. The system 100 may include the client 102, the memory appliance 104, and the one or more interconnects 106. The system 100 may include additional, fewer, or different elements. For example, the system 100 may include multiple clients and/or multiple memory appliances. In another example, the system 100 may include just the client 102 or just the memory appliance 104. Alternatively or in addition, the system 100 may include one or more management servers.

The client 102 may include a memory 108, a memory controller 110, a processor 112, and a communication interface 114. The client 102 may include additional, fewer, or different components. For example, the client 102 may include a storage controller 116, a backing store 118, multiple storage controllers, multiple backing stores, multiple memories, multiple memory controllers, multiple processors, or any combination thereof.

The memory appliance 104 may include memory 130 that may be externally allocatable as primary memory to the client 102. The client 102 may be a machine or a device that requests this external memory. The client 102 may contain local memory, such as the memory 108 illustrated in FIG. 2, which operates as primary memory of the client 102. However, an external memory allocation may be requested by the client 102 to scale the capacity of the primary memory available locally to the client 102. Alternatively or in addition, the client 102 may operate the locally available primary memory, such as the memory 108 in FIG. 2, as a cache memory when accessing the externally allocated memory from the memory appliance 104. For example, the cache memory may be used by the client 102 to reduce average time to access data from the externally allocated memory in the memory appliance 104. The locally available primary memory of the client 102 may be faster to access than the externally allocated memory, and may be used to store copies of data from frequently used memory locations of the externally allocated memory. For example, the client 102 may read data from or write data to a location in the externally allocated memory. The client 102 may first check whether a copy of the data is in the cache memory, such as the locally available memory. If so, the client 102 may read the data from or write the data to the cache memory, which may be faster than reading from or writing to the externally allocated memory.

An external memory allocation may reference one or more regions 132 in the memory 130 of the memory appliance 104. The client 102 may allocate and/or manipulate external memory allocations and/or the regions 132 using allocation logic requests.

The memory 108 of the client 102 may include a client logic 120. The memory 108 of the client 102 may include additional, fewer, or different components. For example, the memory 108 of the client 102 may include an application logic 122, a data interface, and/or file data 124. The processor 112 may execute computer executable instructions that are included in the client logic 120 and/or the application logic 122. The components of the client 102 may be in communication with each other over an interconnect 126, similar to, or the same as, an interconnect 128 in the memory appliance 104 or over any other type of interconnect.

The file data 124 may include one or more portions of the contents of a file 150. The file 150 may be, for example, a pseudo file for accessing external memory, such as the memory 130 on the memory appliance 104. In other examples, the file 150 may be any other type of file. The one or more portions of the file 150 may be uniform in size. For example, the one or more portions may each be the size of a memory page. The file data 124 may include cached pages that have been read from the file 150 and/or that have been written to, but that may not yet have been written back to the file 150. In at least one example implementation, the file data 124 may be included in a page cache, a buffer cache, and/or any other type of cache. The file 150 may be included in the memory 130 of the memory appliance 104. For example, the file 150 may be included in the region 132. Alternatively or in addition, the file may be the region 132.

Pages of the file data 124 may be backed by the file 150. For a page of the file data 124 to be backed by the file 150 may mean that the data of pages within the file data 124 may be written back to the file 150 as determined by an operating system and/or other logic. For example, the operating system may determine that the memory occupied by the page is needed for other purposes and may write the data of the page to the corresponding portion of the file 150 prior to reusing the memory for other purposes. When the memory of the page is reused for other purposes, one or more address spaces that reference the memory page may remove the reference to the page and/or may reference the file 150 instead.

The file 150 may be a regular file in a filesystem, a special file, a block device file, a character device file, a pseudo file, any other type of file, a partition, a logical volume, a swap file, a swap partition, a swap device, and/or any other interface that can be used to organize data with offsets. For example, the file 150 may simply be an interface that enables reading and writing to specified offsets of the region. The file 150 may be backed by any medium capable of holding data, such as a solid state memory, a random access memory (RAM), a dynamic random access memory (DRAM), a static random access memory (SRAM), a flash memory, a read-only memory (ROM), an electrically erasable programmable read-only memory (EEPROM), a flash memory, a phase change memory, a memristor memory, a solid state storage device, a magnetic disk, tape, other media, etc. In one example, the file 150 may include an interface to enable memory mapping to a peripheral that enables access to solid state memory, such as a PCIe-attached flash-memory peripheral. In another example, the file 150 may include an interface, such as an interface in a virtual filesystem, that allows access to a corresponding area of memory in a memory appliance. As such, reading or writing data to a specified offset within the file 150 may cause the virtual filesystem to read or write data from the corresponding offset within the memory 130 of the memory appliance 104. Similarly, when the file 150 is memory-mapped, page faults in memory backed by the file 150 may cause the virtual filesystem to read data from the corresponding offset within the memory 130 of the memory appliance 104, and/or writeback to the file 150 may cause the virtual filesystem to write data to the corresponding offset within the memory 130 of the memory appliance 104. The memory appliance may be external to the client 102, such as described in U.S. non-provisional patent application Ser. No. 14/530,908, filed Nov. 3, 2014, entitled "DYNAMICALLY PROVISIONABLE AND ALLOCATABLE EXTERNAL MEMORY," or in U.S. non-provisional patent application Ser. No. 14/554,655, filed Nov. 26, 2014, entitled "PROVISIONING OF EXTERNAL MEMORY." As such, the file 150 may be associated with the region 132 and/or with the external memory allocation that references the region 132.

By way of an example, the system 100 may provide pseudo files in a filesystem, a user and/or a process may open one or more of the pseudo files, and memory map (mmap) operations may be performed on the one or more pseudo files. A pseudo file may be a logical entity accessible through a file interface, where the pseudo file may be accessed or otherwise used like a file through the file interface, but the pseudo file may not be a file stored in a traditional file system. For example, reads and writes to the pseudo file may be translated into reads and writes to one or more of the memory appliances instead of accessing data in the traditional file system. Alternatively or in addition, the memory map operations may be performed on any other type of file, such as a file in a traditional filesystem, a block device file, etc. Other examples of a file are listed elsewhere in this document. A memory-mapped file may be a segment of virtual memory which has been assigned to a portion of a file or a pseudo file.

A memory allocation wrapper around this memory map capability may be provided through which a user and/or process may allocate memory from the memory appliance to use as its application memory. Examples of the memory allocation wrapper are described in U.S. Provisional Patent Application 62/139,310 entitled "FORK-SAFE MEMORY ALLOCATION FROM MEMORY-MAPPED FILES WITH ANONYMOUS MEMORY BEHAVIOR" filed Mar. 27, 2015

The client logic 120 may include one or more hypervisors 152. The hypervisor 152 may be computer software, firmware, and/or hardware that executes one or more virtual machines. A processing device on which the hypervisor 152 executes the virtual machine may be called a host machine, and each virtual machine may be called a guest machine. The hypervisor 152 may include logic which virtualizes the physical resources of the client and/or that allows one or more application logics to operate with the hypervisor as if operating directly with the physical resources of the client. The hypervisor 152 may be a type 1 hypervisor, such as hypervisors that run directly upon the hardware of the client; a type 2 hypervisor, such as hypervisors that run within one or more processes with an operating system included in the client logic 120; a hybrid hypervisor, such as hypervisors that run partially within one or more processes within the operating system and/or partially upon the hardware of the client, such as in the kernel of the operating system; any other type of hypervisor now known or later discovered; and/or any combination of hypervisor types. The hypervisor 152 may provide isolation between the application logics.

Alternatively or in addition, the client logic 120 may include an operating system-level virtualization logic 154, such as a container hosting logic, a jail hosting logic, and/or a zone hosting logic. The operating system-level virtualization logic 154 may provide operating system-level virtualization. Operating system-level virtualization may be an isolated user-space instance created by an operating system capable of creating multiple isolated user-space instances. Examples of the operating system-level virtualization include a container, a jail, and/or a zone. The operating system-level virtualization logic 154 may include interfaces that provide access to the physical resources of the client and/or that may not necessarily allow the application logic to operate as if operating directly with the physical resources of the client 102. For example, the operating system-level virtualization logic 154 may include interfaces of an operating system which limit the number of CPU cores, amount of CPU time, amount of memory, which peripherals, which files, which filesystems, or any other type of resource that the application logic may access. In one example, the operating system-level virtualization logic 154 may include a memory allocation interface, such as the memory allocation wrapper. The memory allocation interface may limit the amount of memory available to the container, jail, and/or zone by failing memory allocations that would exceed the limit. With the operating system-level virtualization logic 154, the application logic 122 may not include an operating system in some examples and/or may only include part of an operating system. For example, the application logic 122 may rely upon an operating system kernel included in the client logic 120.

The one or more application logics may include one or more virtual machines. A virtual machine may include logic that provides interfaces which approximate, emulate, and/or match the interfaces used to interact directly with the physical resources of the client. The interfaces may be provided to invoking logic, such as application logic, one or more operating systems, and/or any other logic that may invoke the interfaces. The interfaces may enable the invoking logic to operate with the virtual machine as if operating directly with the physical resources of the client. In one example, such as with a type-2 and/or hybrid hypervisor, the virtual machine may operate as a single process and/or logic with the operating system of the client logic. For example, the operating system of the virtual machine may operate as unprivileged logic within the single process and/or logic. The virtual machine may include logic allowing it to interact more efficiently with the hypervisor 152, such as with a paravirtualized virtual machine.

The application logic 122 operating with the operating system-level virtualization logic 154 may be considered an operating system-level virtualization or isolated user-space. Examples of the operating system-level virtualization include a container, a jail, and/or a zone. Alternatively or in addition, the application logic operating with the operating system-level virtualization logic 154 may be considered a virtual machine, though in this example, rather than operating as if interacting directly with the physical resources of the client, the virtual machine may operate using the interfaces included with the operating system-level virtualization logic 154. In one example, the operating system-level virtualization may operate as one or more processes with the operating system of the client logic. For example, each process of the container, jail, and/or zone may operate as a process with the operating system-level virtualization logic 154 of the operating system.

Throughout this text, the terms hypervisor 152, the operating system-level virtualization logic 154, container hosting logic, jail hosting logic, and/or zone hosting logic may be used interchangeably to refer to the portion of the client logic 120 responsible for providing interfaces and/or abstractions to facilitate sharing access to the physical resources of the client 102 with one or more application logics. Also, the terms virtual machine, operating system-level virtualization, container, jail, and/or zone may be used interchangeably to refer to the portion of the application logic 122 which utilizes the interfaces and/or abstractions provided by the client logic 120.

The virtual machine and the operating system-level virtualization are examples of a virtualization instance 156. The hypervisor 152 and the operating system-level virtualization logic 154 are examples of virtualization logic that may execute one or more virtualization instances.

The client logic 120 may create mappings between one or more portions of one or more files and one or more portions of the physical address space of one or more virtual machines. For example, the client logic 120 may select a portion of the file 150 to be used as primary memory for the virtual machine and may memory-map the portion of the file 150 into the physical address space of the virtual machine. Alternatively or in addition, the client logic 120 may utilize a memory paging interface with the hypervisor to create a mapping between one or more portions of the physical address space of the virtual machine and one or more portions of the file. For example, the client logic 120 may select a portion of the file 150 to be used as primary memory for the virtual machine and may direct reads and/or writes from the memory paging interface to corresponding offsets of the file 150. In another example, where the file 150 is an interface that enables reading and writing to specified offsets of the region 132, the client logic 120 may select a portion of the region 132 to be used as primary memory for the virtual machine and may direct reads and/or writes from the memory paging interface to corresponding offsets of the region 132.

The application logic 122, the memory controller 110, the processor 112, the one or more communication interfaces 114, the one or more interconnects 126, the storage controller 116, and/or the backing store 118 may be the same or similar to the correspondingly-named components in the client described in U.S. non-provisional patent application Ser. No. 14/530,908, filed Nov. 3, 2014, entitled "DYNAMICALLY PROVISIONABLE AND ALLOCATABLE EXTERNAL MEMORY," or the correspondingly-named components described in U.S. non-provisional patent application Ser. No. 14/554,655, filed Nov. 26, 2014, entitled "PROVISIONING OF EXTERNAL MEMORY."

By way of example, the system 100 may store data of one or more memory regions in one or more memory appliances. The memory appliance 104 may be a server, a device, an embedded system, a circuit, a chipset, an integrated circuit, a field programmable gate array (FPGA), an application-specific integrated circuit, a virtual machine, an operating system, a kernel, a device driver, a device firmware, a hypervisor service, a cloud computing interface, and/or any other hardware, software, and/or firmware entity. The memory appliance 104 may include the memory 130, a memory controller 134, a communication interface 136, a processor 138, a storage controller 140, and a backing store 142. In other examples, the memory appliance 104 may include additional, fewer, or different elements. For example, the memory appliance 104 may not include the storage controller 140 and the backing store 142. The memory 130 may further include a region access logic 144, the regions 132, region metadata (not shown), and an observer logic 146. The observer logic 146 may not be present in some examples. The region access logic 144 and/or the observer logic 146 may be referred to as a region access unit and/or an observer unit, respectively. The memory appliance 104 may include additional, fewer, or different elements. For example, the memory appliance 104 may include multiple backing stores, multiple storage controllers, multiple memories, multiple memory controllers, multiple processors, or any combination thereof. The memory appliance 104 may store data received over the one or more interconnects 106.

The region access logic 144 in the memory appliance 104 may register the regions 132 or portions of the regions 132 with one or more communication interfaces. Alternatively or in addition, the region access logic 144 may provide and/or control access to the region 132 by one or more clients. The communication interface 114 in the client 102 may provide client-side memory access to the memory 130 of the memory appliance 104, to the regions 132, and/or to portions of the regions 132 in the memory appliance 104. The one or more interconnects 106 or networks may transport data between the communication interface 114 of the client 102 and the communication interface 136 of the memory appliance 104. For example, the communication interfaces 114 and 136 may be network interface controllers or host controller adaptors.

A client-side memory access may bypass the processor 112, such as a CPU (Central Processing Unit), at the client 102 and/or may otherwise facilitate the client accessing the memory 130 on the memory appliance 104 without waiting for an action by the processor 112 and/or 138 included in the client 102, in the memory appliance 104, or both. For example, the client-side memory access may be based on the Remote Direct Memory Access (RDMA) protocol. The RDMA protocol may be carried over an InfiniBand interconnect, an iWARP interconnect, an RDMA over Converged Ethernet (RoCE) interconnect, True Scale, Omni-Path, and/or any other interconnect and/or combination of interconnects known now or later discovered. Alternatively or in addition, the client-side memory access may be based on any other protocol and/or interconnect that may be used for accessing memory. A protocol that may be used for accessing memory may be a CPU protocol/interconnect, such as HyperTransport and/or Quick Path Interconnect (CPI). Alternatively or in addition, a protocol that may be used for accessing memory may be a peripheral protocol/interconnect, such as Peripheral Component Interconnect (PCI), PCI Express, PCI-X, ISA, and/or any other protocol/interconnect used to interface with peripherals and/or access memory. The communication interfaces 114 and 136 may provide reliable delivery of messages and/or reliable execution of memory access operations, such as any memory access operation carried out when performing the client-side memory access. Alternatively or in addition, delivery of messages and/or execution of memory access operations may be unreliable, such as when data is transported between the communication interfaces using the User Datagram Protocol (UDP). The client 102 may read, write, and/or perform other operations on the memory 130, to the regions 132 within the memory 130, and/or to portions of the regions 132 using client-side memory access. In providing client-side memory access, the client 102 may transmit requests to perform memory access operations to the memory appliance 104. In response, the memory appliance 104 may perform the memory access operations. Similar to the storage device of U.S. patent application Ser. No. 13/036,544, filed Feb. 28, 2011, entitled "High performance data storage using observable client-side memory access" by Stabrawa, et al., which published as US Patent Application Publication US2012/0221803 A1, and which is hereby incorporated by reference, the memory appliance 104 may observe or otherwise identify the memory access operations. In response to identifying the memory access operations, the memory appliance 104 may, for example, copy the data of the region 132 to one or more backing stores independently of performing the memory access operations on the memory. A backing store, such as the backing store 142 illustrated in FIG. 2, may include one or more persistent non-volatile storage media, such as flash memory, phase change memory, memristors, EEPROM, magnetic disk, tape, or some other media. The memory 130 and/or the backing store 142 (if included) may be subdivided into regions.

The memory 108 and/or 130 may be any memory or combination of memories, such as a solid state memory, a random access memory (RAM), a dynamic random access memory (DRAM), a static random access memory (SRAM), a flash memory, a read-only memory (ROM), an electrically erasable programmable read-only memory (EEPROM), a flash memory, a phase change memory, a memristor memory, any type of memory configured in an address space addressable by the processor, or any combination thereof. The memory 108 and/or 130 may be volatile or non-volatile, or a combination of both.

The memory 108 and/or 130 may be a solid state memory. Solid state memory may include a device, or a combination of devices, that stores data, is constructed primarily from electrical conductors, semiconductors and insulators, and is considered not to have any moving mechanical parts. Solid state memory may be byte-addressable, word-addressable or block-addressable. For example, most dynamic RAM and some flash RAM may be byte-addressable or word-addressable. Flash RAM and other persistent types of RAM may be block-addressable. Solid state memory may be designed to connect to a memory controller, such as the memory controller 134 in the memory appliance 104, via an interconnect bus, such as the interconnect 128 in the memory appliance 104.

Solid state memory may include random access memory that permits stored data to be read and/or written in any order (for example, at random). The term "random" refers to the fact that any piece of data may be returned and/or written within a constant time period, regardless of the physical location of the data and regardless of whether the data is related to a previously read or written piece of data. In contrast, storage devices such as magnetic or optical discs rely on the physical movement of the recording medium or a read/write head so that retrieval time varies based on the physical location of the next item read and write time varies based on the physical location of the next item written. Examples of solid state memory include, but are not limited to: DRAM, SRAM, NAND flash RAM, NOR flash RAM, phase change memory (PRAM), EEPROM, FeRAM, MRAM, CBRAM, PRAM, SONOS, RRAM, Racetrack memory, NRAM, Millipede, T-RAM, Z-Ram, and TTRAM.

In contrast to solid state memory, solid state storage devices are systems or devices that package solid state memory with a specialized storage controller through which the packaged solid state memory may be accessed using a hardware interconnect that conforms to a standardized storage hardware interface. For example, solid state storage devices include, but are not limited to: flash memory drives that include Serial Advanced Technology Attachment (SATA) or Small Computer System Interface (SCSI) interfaces, Flash or DRAM drives that include SCSI over Fibre Channel interfaces, DRAM drives that include SATA or SCSI interfaces, and USB (universal serial bus) flash drives with USB interfaces.

In an example, each portion of the memory 130 that includes a corresponding one of the region access logic 144 and the region 132 may be of a different type than other portions of the memory 130. For example, the memory 130 may include a ROM and a solid state memory, where the ROM includes the region access logic 144, and the solid state memory includes the region 132. The memory 130 may be controlled by the memory controller 134. The memory 130 may include more, fewer, or different components. For example, the memory 130 may include the observer logic 146.

The processor 112 and/or 138 may be a general processor, a central processing unit (CPU), a server, a microcontroller, an application specific integrated circuit (ASIC), a digital signal processor, a field programmable gate array (FPGA), a digital circuit, an analog circuit, or any combination thereof. The processor 112 and/or 138 may include one or more devices operable to execute computer executable instructions or computer code embodied in the memory 108 and/or 130 or in other memory to perform features of the system 100. For example, the processor 112 of the client 102 may execute computer executable instructions that are included in the client logic 120 and/or the application logic 122.

The processor 112, the memory controller 110, and the one or more communication interfaces 114 of the client 102 may each be in communication with each other. Each one of the processor 112, the memory controller 110, and the one or more communication interfaces 114 may also be in communication with additional components, such as the storage controller 116, and the backing store 118. The communication between the components of the client 102 may be over the interconnect 126, which may be a bus, a point-to-point connection, a switched fabric, a network, any other type of interconnect, or any combination of interconnects. The communication may use any type of topology, including but not limited to a star, a mesh, a hypercube, a ring, a torus, or any other type of topology known now or later discovered. Alternatively or in addition, any of the processor 112, the memory 108, the memory controller 110, and/or the communication interface 114 may be logically or physically combined with each other or with other components, such as with the storage controller 116, and/or the backing store 118. The relationship between the processor 138, the memory controller 134, and the communication interface 136 of the memory appliance 104 may be the same or similar as the processor 112, the memory controller 110, and the one or more communication interfaces 114 of the client 102. In examples where the processor 112 or 138, such as a CPU, is logically and/or physically combined with other components, such as the communication interface 114 or 136, the client-side memory access may be said to bypass the processor 112 or 138 and/or be independent of the processor 112 or 138 if the data transfer for the client-side memory access is controlled by and/or performed by the communication interface 114 or 136 and/or any other component other than the processor 112 or 138. For example, the communication interface 114 or 136 and/or a direct memory access (DMA) controller may transfer the data independently of the processor 112 or 138 even if the communication interface 114 or 136 and/or DMA controller is included in an integrated chip that also includes the processor 112 or 138. Although the processor 112 or 138 may initiate a memory access operation, such as a read or a write to an address in the address space of the processor 112 or 138, for the client-side memory access, if the communication interface 114 or 136 and/or the DMA controller executes the memory access operation, then the memory access operation is said to be performed independently of the processor 112 or 138.

The memory controller 110 or 134 may include a hardware component that translates memory addresses specified by the processor 112 or 138 into the appropriate signaling to access corresponding locations in the memory 108 or 130. The processor 112 or 138 may specify the address on the interconnect 126 or 128. The processor 112 or 138, the interconnect 126 or 128, and the memory 108 or 130 may be directly or indirectly coupled to a common circuit board, such as a motherboard. In one example, the interconnect 126 or 128 may include an address bus that is used to specify a physical address, where the address bus includes a series of lines connecting two or more components. The memory controller 110 or 134 may, for example, also perform background processing tasks, such as periodically refreshing the contents of the memory. In one example implementation, the memory controller 110 or 134 may be included in the processor 112 or 138.

The one or more communication interfaces 114 or 136 may include any one or more physical interconnects used for data transfer. In particular, the one or more communication interfaces may facilitate communication between the client 102 and the memory appliance 104 and/or any other device. The one or more communication interfaces 114 or 136 may communicate via the one or more interconnects 106. The one or more communication interfaces 114 or 136 may include a hardware component. In addition, the one or more communication interfaces 114 or 136 may include a software component. Examples of the communication interface 114 or 136 include a Direct Memory Access (DMA) controller, an RDMA controller, a Network Interface Controller (NIC), an Ethernet controller, a Fibre Channel interface, an InfiniBand interface, a SATA interface, a SCSI interface, a USB interface, an Ethernet interface, or any other physical communication interface. The one or more communication interfaces 114 or 136 may facilitate client-side memory access, as described throughout this disclosure.

The region 132 may be a configured area of the memory 130 that is accessible via a memory access protocol and/or a storage protocol now known or later discovered. Storage protocols and memory access protocols are described below. The region 132 may be a logical region which maps a sequence of data blocks to corresponding memory locations in the memory 130. Therefore, in addition to the data blocks themselves, the region 132 may include region information, such as a mapping of data blocks to memory locations or any other information about the data blocks. The data blocks of the region 132, which may be configured by the region access logic 144, may all be stored in the memory 130.

The storage controller 116 or 140 of the client 102 or the memory appliance 104 may include a component that facilitates storage operations to be performed on the backing store 118 or 142. A storage operation may include reading from or writing to locations within the backing store. The storage controller 116 or 140 may include a hardware component. Alternatively or in addition, the storage controller may include a software component.

The backing store 118 or 142 may include an area of storage comprising one or more persistent media, including but not limited to flash memory, phase change memory, Memristors, EEPROM, magnetic disk, tape, or other media. The media in the backing store may potentially be slower than the memory on which the region is stored.

The storage controller 116 and/or the backing store 118 of the client 102 may be internal to the client 102, a physically discrete component external to the client 102 and coupled to the backing store 118, included in the client 102 or in a device different from the client 102. Alternatively or in addition, a region included in the memory appliance 104 may be used as the backing store 118 for the client 102.

The memory access protocol may be any communication protocol used to transfer data between a memory in a first device, such as the memory 108 in the client 102, and a memory in a second device, such as the memory 130 in the memory appliance 104, where the data is transferred independently of CPU's in the first and second devices, such as the processor 112 in the client 102 and the processor 138 in the memory appliance 104. Therefore, in examples where the first device includes an operating system, the data may be transferred from the memory of the first device to the memory of the second device without involvement of the operating system. Although instructions executed by the CPU may direct a hardware data controller to transfer the data from the memory of the first device to the memory of the second device, the actual transfer of the data between the memories may be completed without involvement of the CPU and, if the first device includes an operating system, without involvement of the operating system. The memory access protocol may describe, for example, a format of the request for the memory access operation to be performed on the memory in the second device or system.

The memory access protocol may be implemented, for example, using one or more hardware controllers, such as the communication interface 114 in the client 102 and the communication interface 114 in the memory appliance 104. The memory access protocol and electrical characteristics of the hardware controller may be part of a common standard.

Accordingly, the memory access protocol and electrical characteristics of the communication interfaces 114 and 136 may be part of one standard. In one example, the access protocol may be the RDMA protocol implemented in the communication interfaces 114 and 136, where the memory access protocol and the communication interfaces 114 and 136 conform to an InfiniBand standard. In a second example, the memory access protocol may be Internet Wide Area RDMA Protocol (iWARP), where iWARP is implemented in the communication interfaces 114 and 136, and where the communication interfaces 114 and 136 conform to an iWARP standard. The iWARP standard, which is an Internet Engineering Task Force (IETF) protocol, is RDMA over TCP (Transport Control Protocol). In a third example, the memory access protocol may be RDMA over Converged Ethernet (RoCE), where RoCE is implemented in the communication interfaces 114 and 136, and where the communication interfaces 114 and 136 conform to RoCE and Ethernet standards. In a third example, the memory access protocol may be a PCI bus-mastering protocol implemented in the communication interfaces 114 and 136, where the communication interfaces 114 and 136 conform to a PCI standard. The memory access protocol, such as RDMA, may be layered directly over a transport protocol, such as TCP.

A storage protocol may be any communications protocol used to transfer data between a block storage device or system, such as the memory appliance 104, and a device or system, such as the client 102, which stores data in, and/or retrieves data from, the block storage device or system. A storage protocol may be implemented, for example, using one or more software and/or hardware storage controllers, such as the storage controller 116 and/or 140. The storage protocol and electrical characteristics of the hardware storage controller may be part of a common standard. In one example, the storage protocol may be the universal serial bus mass storage device class (USB MSC or UMS), which is a set of computing communications protocols defined by the USB Implementers Forum that runs on a hardware bus, such as the interconnect, that conforms to the USB standard. In a second example, the storage protocol may be the SCSI command protocol. In a third example, the storage protocol may be the SATA protocol. Additional examples of the storage protocol include Serial Attached SCSI (SAS) and Internet Small Computer System Interface (iSCSI). Alternatively or in addition, the region access logic may provide block-level access using any storage protocol that transfers data with a data transfer protocol, such as SCSI over Fibre Channel, SCSI RDMA Protocol (SRP) over Remote Direct Memory Access (RDMA), iSCSI over TCP/IP, or any other combination of storage protocol and data transfer protocol known now or discovered in the future.

Accessing the region 132 of the memory appliance 104 using the storage protocol may be slower than accessing the region 132 using the memory access protocol. In contrast to the memory access protocol, the processor 112 of the client 102 may interact with the storage controller 140 during the transfer of data to the block storage device or system, where the storage controller implements the storage protocol. Therefore, the storage protocol is different from the memory access protocol.

Figure 3:
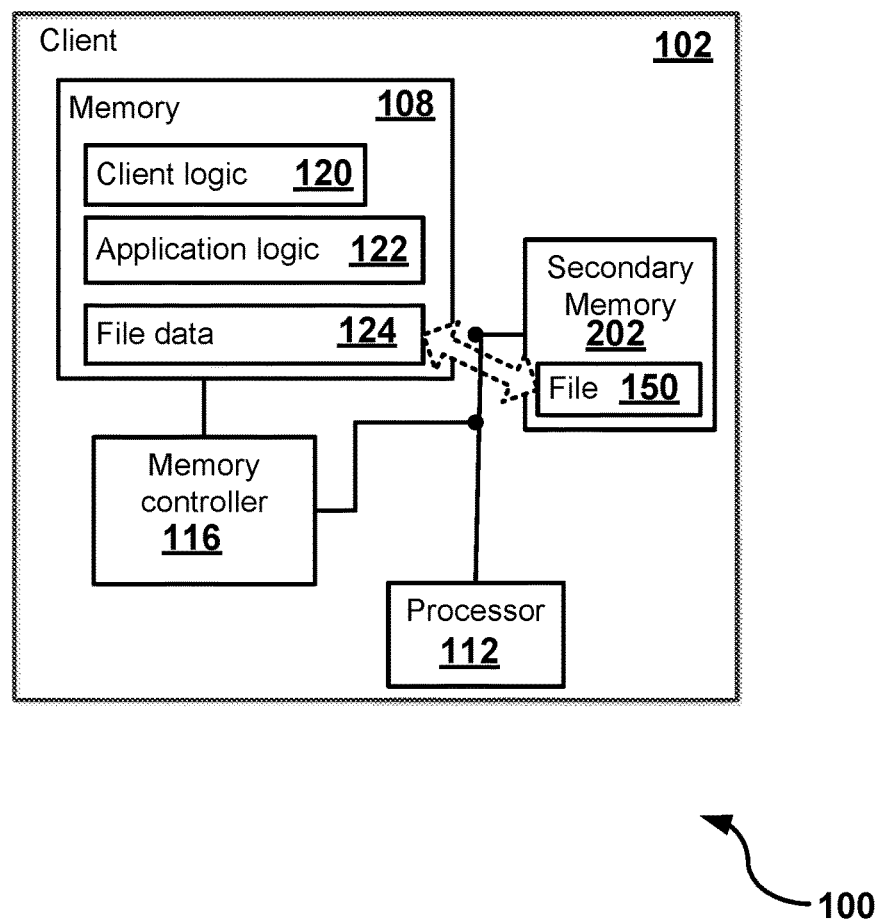
FIG. 3 illustrates a first example of a system using secondary memory for virtualization.

FIG. 3 illustrates a second example of the system 100 to use external memory for virtualization that enables fork-safe memory allocation from memory-mapped files with anonymous memory behavior. The system 100 illustrated in FIG. 3 may not use or have anything to do with allocatable external memory in some examples. The system 100 may include the client 102, where the file 150 is included in a secondary memory 202 included in the client 102. The system 100 may include additional, fewer, or different elements than illustrated.

The secondary memory 202 may be the secondary memory described in U.S. non-provisional patent application Ser. No. 14/530,908, filed Nov. 3, 2014, entitled "DYNAMICALLY PROVISIONABLE AND ALLOCATABLE EXTERNAL MEMORY," or the secondary memory described in U.S. non-provisional patent application Ser. No. 14/554,655, filed Nov. 26, 2014, entitled "PROVISIONING OF EXTERNAL MEMORY." Alternatively or in addition, the secondary memory 202 may be the backing store 118 and/or the storage controller 116. Alternatively or in addition, the secondary memory 202 may include any one or more data storage media, such as DRAM, flash memory, solid-state disks, PCIe-attached storage, etc. The file 150 may be included in the secondary memory 202. Alternatively or in addition, the file 150 may be the secondary memory 202.

Figure 4:
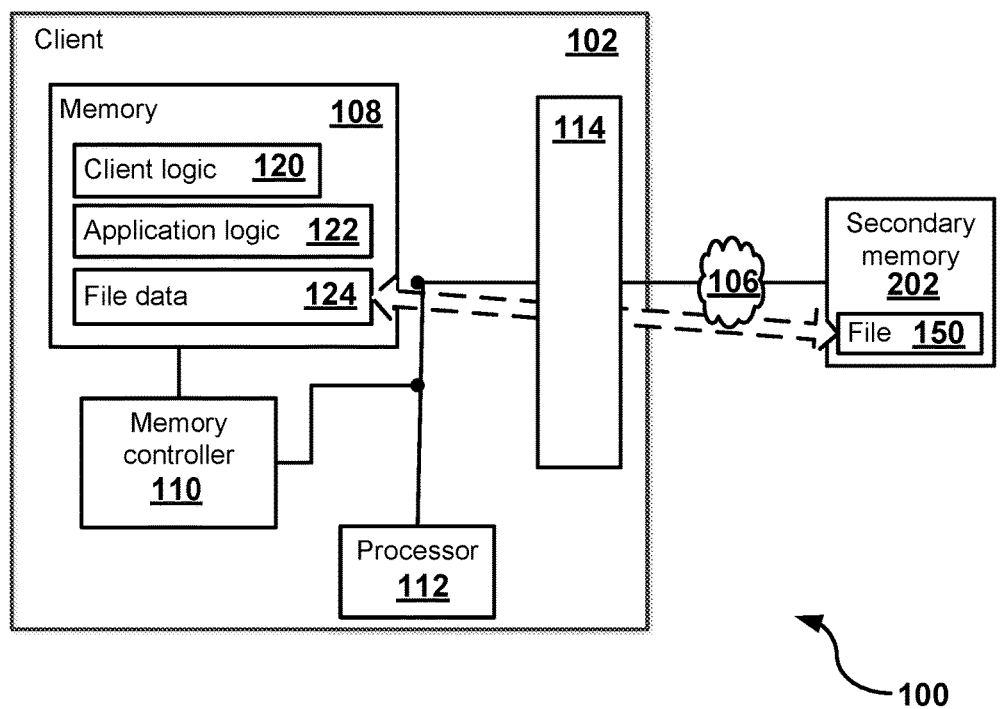
FIG. 4 illustrates a second example of a system using secondary memory for virtualization.

FIG. 4 illustrates a third example of the system 100 to use external memory for virtualization. The system 100 illustrated in FIG. 4 includes the client 102 and the secondary memory 202, where the secondary memory 202 is external to the client 102 and includes the file 150. The secondary memory 202 may be in communication with the client 102 via the one or more interconnects 106. The secondary memory 202 may be a storage device or storage system, such as a SCSI disk, a Fibre-Channel-attached RAID array, an SSD, a flash memory device, and/or any other type of external storage.

Figure 5:
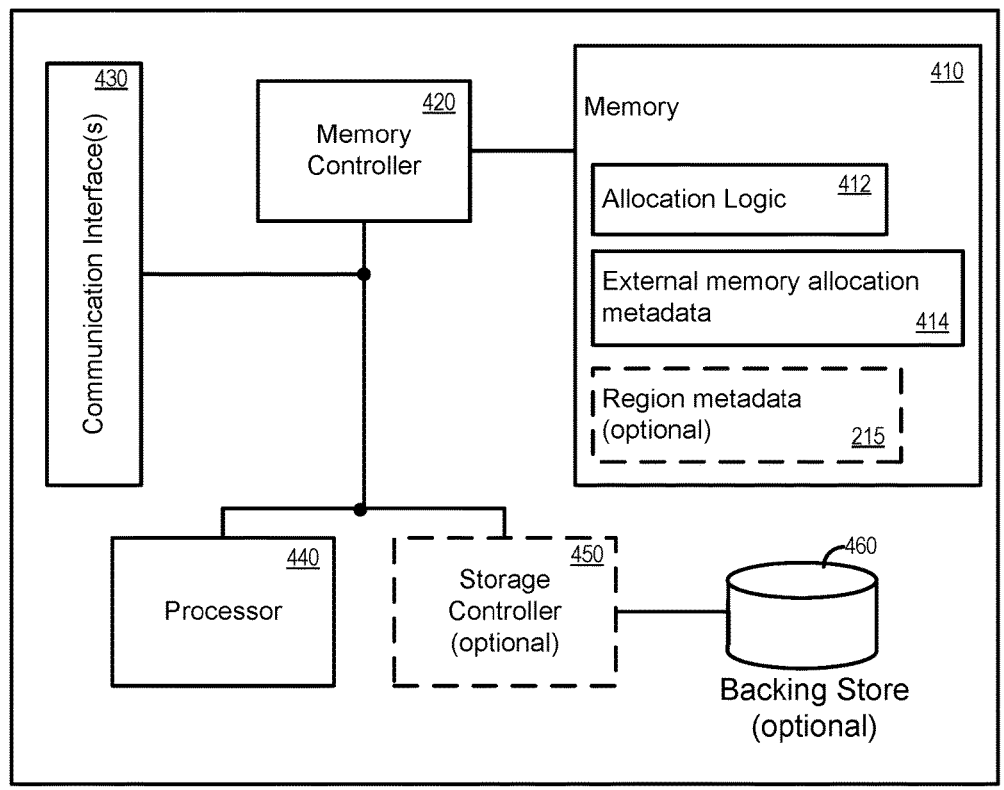
FIG. 5 illustrates an example management server.

FIG. 5 illustrates an example of the management server 107. The management server 107 may include a memory 410, a processor 440, a communication interface 430, and a memory controller 420, similar to the memory 210, the processor 240, the communication interface 230, and the memory controller 220 of the memory appliance 104. The management server 107 may include more, fewer, or different components. For example, the management server may include a storage controller 450, a backing store 460, multiple storage controllers, multiple backing stores, multiple memories, multiple memory controllers, multiple processors, or any combination thereof. Alternatively, the management server 107 may just include a process executed by the processor 440.

The storage controller 450 and/or the backing store 460 of the management server 107 may be internal to the management server 107, a physically discrete device external to the management server 107 that is coupled to the management server 107, included in a second management server or in a device different from the management server 107, included in the client 102, included in the memory appliance 104, part of a server, part of a backup device, part of a storage device on a Storage Area Network, and/or part of some other externally attached persistent storage. Alternatively or in addition, the region 132 included in the memory appliance 104 may be used as the backing store 460 for the management server 107.

The memory 410 of the management server 107 may include an allocation logic 412 and/or external memory allocation metadata 414. The memory 410 of the management server 107 may include more, fewer, or different components. For example, the memory 410 of the management server 107 may include region metadata 215. The processor 440 may execute computer executable instructions that are included in the allocation logic 412. The allocation logic 412 may be referred to as an allocation logic unit. The components of the management server 107 may be in communication with each other over an interconnect 470, such as the interconnect 270 in the memory appliance 104 or over any other type of interconnect.

During operation of the external memory system, the region access logic 144 may provide the client 102 and/or management server 107 with client-side memory access to the region 132. Alternatively or in addition, the region access logic 144 may provide other memory appliances with client-side memory access to the region 132. Client-side memory access may include a memory access operation. A memory access operation may include, for example, a read memory operation or a write memory operation. The memory access operation may be performed by the memory appliance 104 in response to receiving a request from the client 102 and/or management server 107 at the communication interface 230 of the memory appliance 104. The request may include, for example, a starting memory offset, a size of memory allocation, a starting memory location, a number of units of memory to access, or any other attribute relating to the requested memory access operation. The request may address the memory 210 on a block-addressable basis, a word-addressable basis, a byte-addressable basis, or on any other suitable unit of memory basis.

The region access logic 144 may register the region 132 with the communication interface 230 and/or with a device other than the memory appliance, such as with the client 102 and/or management server 107. Alternatively or in addition, the region access logic 144 may determine a location or locations in the memory 210 of the memory appliance 104 where the region 132 is located. The region access logic 144 may register the location or locations with the communication interface 230 and/or with a device other than the memory appliance 104, such as with the client 102 and/or management server 107.

The region access logic 144 may control and/or specify how the region 132 may be accessed. For example, the region access logic 144 may control which regions are available on the memory appliance 104 and/or which operations may be performed. In one example, the region access logic 144 may control access based upon the current time, day, month or year; an identity or a location of the communication interface, an identity or a location of the client and/or management server; or some other attribute of the client 102, the memory appliance 104, the management server 107, the interconnect 106, or of the surrounding environment that is detectable by the region access logic 144, such as the condition of the power source that powers the memory appliance 104. Alternatively or in addition, the region access logic 144 may control access based on an authentication mechanism, including but not limited to a password, a key, biometrics, or a cryptographic authentication.

The region access logic 144 or the communication interface 230 may provide client-side memory access using any memory access protocol now known or later discovered. The memory access protocol may be any communication protocol used to transfer data between a memory in a first device, such as the memory 310 in the client 102, and a memory in a second device, such as the memory 210 in the memory appliance 104, where the data is transferred independently of CPU's in the first and second devices, such as the processor 340 in the client 102 and the processor 240 in the memory appliance 104. Therefore, in examples where the first device includes an operating system, the data may be transferred from the memory of the first device to the memory of the second device without involvement of the operating system. Although instructions executed by the CPU may direct a hardware data controller to transfer the data from the memory of the first device to the memory of the second device, the actual transfer of the data between the memories may be completed without involvement of the CPU and, if the first device includes an operating system, without involvement of the operating system. The memory access protocol may describe, for example, a format of the request for the memory access operation to be performed on the memory in the second device or system.

The memory access protocol may be implemented, for example, using one or more hardware controllers, such as the communication interface 230 in the memory appliance 104 and the communication interface 330 in the client 102. The memory access protocol and electrical characteristics of the hardware controller may be part of a common standard. Accordingly, the memory access protocol and electrical characteristics of the communication interfaces may be part of one standard. In one example, the access protocol may be the RDMA protocol implemented in the communication interfaces, where the memory access protocol and the communication interfaces conform to an InfiniBand standard. In a second example, the memory access protocol may be Internet Wide Area RDMA Protocol (iWARP), where iWARP is implemented in the communication interfaces, and where the communication interfaces conform to an iWARP standard. The iWARP standard, which is an Internet Engineering Task Force (IETF) protocol, is RDMA over TCP (Transport Control Protocol). In a third example, the memory access protocol may be RDMA over Converged Ethernet (RoCE), where RoCE is implemented in the communication interfaces, and where the communication interfaces conform to RoCE and Ethernet standards. In a third example, the memory access protocol may be a PCI bus-mastering protocol implemented in the communication interfaces, where the communication interfaces conform to a PCI standard. The memory access protocol, such as RDMA, may be layered directly over a transport protocol, such as TCP.

The region access logic 144, the client logic 312, and/or the allocation logic 412 may utilize multiple communication interfaces to provide resiliency against various communication failure modes. Communication failure modes may include failure of one or more communication interfaces, failure of one or more ports included in one or more communication interfaces, failure of a portion of the interconnect, such as an interconnect cable or interconnection fabric switch, and/or any other failure that may sever a network link between any two communication interfaces. The region access logic 144 may provide resiliency against communication failure modes using features of the communication interfaces. In a first example, the region access logic 144 may configure the communication interfaces to use an alternate path if a primary path experiences interconnect errors, such as using InfiniBand Automatic Path Migration. In a second example, the region access logic 144 may provide resiliency against communication failure modes by choosing communication modes that are by design resilient against interconnect errors, such as InfiniBand reliable connections, TCP connections, etc. Alternatively or in addition, the region access logic 144 may provide resiliency against communication failure modes by establishing multiple active network links, and using one or more of the non-failing network links to provide connectivity. The multiple active network links may be selected to optimize redundancy versus failures. For example, the multiple network links may utilize different ports on different communication interfaces, such that a failure of one port or one communication interface may only cause one of the multiple active network links to fail.

In one or more examples, the region access logic 144 may additionally provide block-level access to the region 132 using any storage protocol now known or later discovered. A storage protocol may be any communications protocol used to transfer data between a block storage device or system, such as the memory appliance 104, and a device or system, such as the client 102, that stores data in, and/or retrieves data from, the block storage device or system. A storage protocol may be implemented, for example, using one or more software and/or hardware storage controllers. The storage protocol and electrical characteristics of the hardware storage controller may be part of a common standard. In one example, the storage protocol may be the universal serial bus mass storage device class (USB MSC or UMS), which is a set of computing communications protocols defined by the USB Implementers Forum that runs on a hardware bus, such as the interconnect, that conforms to the USB standard. In a second example, the storage protocol may be the SCSI command protocol. In a third example, the storage protocol may be the SATA protocol. Additional examples of the storage protocol include Serial Attached SCSI (SAS) and Internet Small Computer System Interface (iSCSI). Alternatively or in addition, the region access logic 144 may provide block-level access using any storage protocol that transfers data with a data transfer protocol, such as SCSI over Fibre Channel, SCSI RDMA Protocol (SRP) over Remote Direct Memory Access (RDMA), iSCSI over TCP/IP, or any other combination of storage protocol and data transfer protocol known now or discovered in the future.

Accessing the region 132 using the storage protocol may be slower than accessing the region 132 using the memory access protocol. In contrast to the memory access protocol, the processor 340 of the client 102 may interact with the storage controller 350 during the transfer of data to the block storage device 360 or system, where the storage controller implements the storage protocol. Therefore, the storage protocol is different from the memory access protocol.

By providing block-addressable client-side memory access and/or block-level access through the region access logic 144, the memory appliance 104 may be considered, in an example implementation, a block storage device. A block storage device may also be referred to as a block device. A block device stores data in blocks of a predetermined size, such as 512 or 1024 bytes. The predetermined size may be configurable. A block device is accessed via a software and/or hardware storage controller and/or a communication interface, such as the communication interface 230. Examples of other block devices include a disk drive having a spinning disk, a tape drive, a floppy disk drive, and a USB flash pen drive.

The region access logic 144 may subdivide the memory 210, and/or the backing store 260 into one or more regions. Each one of the regions, such as the region 132 in the memory 210 of the memory appliance 104, may be a configured area of storage that is accessible via any access protocol and/or storage protocol. Access protocols and storage protocols are described elsewhere in this disclosure.

The backing store 260 may include any block device. Examples of block devices include, but are not limited to, hard disks, CD-ROM drives, tape drives, solid state storage devices, flash drives, or any other mass storage device.

The client logic 312 and/or the allocation logic 412 may perform memory access operations on the region 132 in the memory 210 of the memory appliance 104 using client-side memory access over the memory access protocol. Alternatively or in addition, the client logic 312 and/or the allocation logic 412 may perform operations to discover the memory appliance 104 when connected, or to discover available regions that may be accessible on the memory appliance 104. Alternatively or in addition, the client logic 312 and/or the allocation logic 412 may perform administration operations to modify attributes or metadata, such as the region metadata 215, associated with the region 132. The operations may include sending region access logic requests, described elsewhere in this disclosure. In an example, the client logic 312 and/or the allocation logic 412 may perform an administration operation to set a human readable label associated with the region 132. In an example, the client logic 312 and/or the allocation logic 412 may perform an administration operation to change the operations that are available to the client 102 and/or to other clients. The administration operations may be used, for example, to coordinate shared access to the region by multiple clients.

The client logic 312 and/or the allocation logic 412 may perform operations that communicate information to the observer logic 218 about a set of one or more memory access operations that were requested or that are to be requested by the client logic 312 and/or the allocation logic 412. For example, the client logic 312 and/or the allocation logic 412 may transmit a notification message via the communication interface 330 of the client 102 and/or the communication interface 430 of the management server 107. The observer logic 218 may receive the notification message via the communication interface 230 of the memory appliance 104. The notification message may precede and/or follow the set of memory access operations requested by the client logic 312 and/or the allocation logic 412. The notification message may identify attributes of the set of memory access operations.

Alternatively or in addition, the client logic 312 and/or the allocation logic 412 may perform memory access operations that are directly observable or identified by the observer logic 218. For example, the request to perform the memory access operation may include notification information, such as an RDMA write with immediate value operation. In addition to writing to the memory in the region 132, the write with immediate value operation may cause the observer logic 218 to receive a notification that includes the immediate value specified by the client logic 312 and/or the allocation logic 412 in the RDMA write with immediate value operation. The value may include one or more attributes of the memory access operation. For example, the value may indicate what portion of the memory 210 is written to during the RDMA write with immediate value operation. Alternatively or in addition, the client logic 120 and/or the allocation logic 412 may perform operations that create a condition at the memory appliance 104 that the observer logic 218 may check for. For example, the client logic 312 and/or the allocation logic 412 may perform a client-side memory access operation to store information about a set of memory access operations in a particular portion of the memory on the memory appliance 104. The information stored in the portion may include, for example, the offset, size, and/or type of each memory access operation performed. The observer logic may check the portion for updates in order to identify one or more attributes of the memory access operations.

The observer logic 218 may observe or otherwise identify the operations requested by the client logic 312 and/or the allocation logic 412 that are performed on the region 132 and/or the memory appliance 104. The observer logic 218 may identify the requested operations based on direct communication between the memory appliance 104 and any of: the client 102, the management server 107, and/or another memory appliance. For example, the observer logic 218 may listen for incoming notification messages at the communication interface 230. Alternatively or in addition, the observer logic 218 may passively monitor the operations requested by the client logic 312 and/or the allocation logic 412. For example, the observer logic 218 may listen for notification messages received as a result of operations performed by the client logic 312 and/or the allocation logic 412.

Alternatively or in addition, the observer logic may check for conditions created by the client logic 312, the allocation logic 412, the communication interfaces, or another hardware component. For example, the observer logic 218 may read contents of one or more portions of the memory 210 that are accessible by the client 102 and/or the management server 107 using client-side memory access, by the communication interfaces, or by another hardware component. In an example, a first portion of the memory 210 may include one or more flags that indicate whether one or more second portions of the memory 210 have been updated by the memory access operations since the one or more second portions of the memory 210 were last copied to the backing store 260. In a second example, a first portion of the memory 210 may include one or more flags that indicate whether one or more second portions of the memory 210 have been read or written by the memory access operations since the last time the flags have been checked by the observer logic 218. In a third example, a first portion of the memory 210 may include one or more values that indicate how many times one or more second portions of the memory 210 have been read or written by the memory access operations since the last time the values have been checked by the observer logic 218.

In response to identifying a set of memory access operations, the observer logic 218 may take further action. In an example, further action may include determining statistics related to the memory access operations (including but not limited to the type of operation, the number of operations, the size of the affected memory, and/or memory locations of each operation). In a second example, further action may include tracking or identifying regions of the memory 210 that have been written to or otherwise affected by the memory access operations. The observer logic 218 may persist the contents of the affected regions of the memory 210 to the backing store 260, backing stores, and/or duplicate the contents of the affected regions of the memory 210 to another memory appliance, a block device, an external server, and/or a backup device. Alternatively, the observer logic 218 may take any other action related to the memory access operations.

The memory access operation may complete at the memory appliance 104 without waiting for the observer logic 218 to identify the memory access operation. Alternatively or in addition, the memory access operation may complete at the memory appliance 104 without waiting for the observer logic 218 to take any further action in response to identifying the memory access operation. Accordingly, the client logic 312 and/or the allocation logic 412 may perform a write operation to the region 132 in the amount of time that the request to perform the write operation travels over the interconnect 106 and the memory appliance 104 writes data to the memory. The overhead associated with storage protocols and/or writing the data to the backing store 260 may be avoided.

Mechanisms for observing or identifying the operations requested by the client logic 312 and/or the allocation logic 412 and the actions taken in response to identifying the operations may take any of numerous forms. A particular mechanism may balance tradeoffs between individual operation latency, operations per second from an individual client and/or management server, aggregate operations per second from multiple clients and/or management servers, demand placed upon compute resources of the clients, demand placed on compute resources of the management servers, and demand placed on compute resources of the memory appliance or on the observer logic, among others.

Alternatively or in addition the observer logic 218 may not observe or identify the memory access operations performed. Alternatively or in addition, the observer logic 218 may take one or more actions without specific knowledge of the memory access operations. For example, the observer logic 218 may persist the entire contents of the region 132 to the backing store 260; duplicate the entire contents of the region 132 to another storage device, external server, and/or backup device; and/or take some other action related to the region 132. Alternatively or in addition, the observer logic 218 may compare the contents of the region 132 with the contents of the backing store 260. Alternatively or in addition, the observer logic 218 may use computed hash values to determine which areas of the region 132 have been modified. A computed hash value may be a computed output which is expected with high probability to have a different value for two different input buffers and which may be smaller than one or both input buffers. Examples of computed hash values include checksums, cyclic redundancy check codes, and cryptographic hash codes. The observer logic 218 may perform actions without knowledge of the memory access operations periodically, prior to system shutdown, according to a schedule, or in response to a particular event, such as a hardware interrupt.

Alternatively, a client-side memory access may be performed as described throughout this disclosure, and then the client logic 312 may choose to wait for an additional notification from the observer logic 218 that the further actions are complete. For example, the client-side memory access may be a first client-side memory access, and the further actions may include replicating data from the affected regions to one or more additional memory appliances using additional client-side memory accesses between the memory appliances. Waiting for the additional notification for the first client-side memory access provides assurance to the client logic 312 that the affected regions have been synchronized between the multiple memory appliances. If an application is performing activities that may benefit from this assurance, it may be beneficial to wait for the additional notification. While waiting for the additional notification does increase the overall latency of the first client-side memory access by the time it takes for the observer logic 218 to be notified and replicate the affected regions and the time it takes to receive the additional notification, the client logic 312 still does not need to wait for the observer logic 218 of the additional memory appliances to be notified or take any action.

The application logic, the client logic 312, and/or the allocation logic 412 may perform data translation on the data being read and/or written to the region 132. Alternatively or in addition, the communication interfaces, the memory controllers, the storage controllers, and/or the backing stores may perform data translation. Data translation may include manipulating the data being read and/or written.

In a first example, the application logic, the client logic, the allocation logic, the communication interfaces, the memory controllers, the storage controllers, and/or the backing stores may compress the data being written to the region 132 and/or decompress the data being read from the region 132. Compression and/or decompression may be performed using any one or more compression schemes, such as Lempel-Ziv (LZ), DEFLATE, Lempel-Ziv-Welch (LZW), Lempel-Ziv-Renau (LZR), Lempel-Ziv-Oberhumer (LZO), Huffman encoding, LZX, LZ77, Prediction by Partial Matching (PPM), Burrows-Wheeler transform (BWT), Sequitur, Re-Pair, arithmetic code, and/or other scheme which may be used to recoverably reduce the size of data.

In a second example, the application logic, the client logic, the allocation logic, the communication interfaces, the memory controllers, the storage controllers, and/or the backing stores may encrypt the data being written to the region 132 and/or decrypt the data being read from the region 132. Encryption and/or decryption may be performed using any one or more encryption schemes and/or ciphers, such as symmetric encryption, public-key encryption, block ciphers, stream ciphers, substitution ciphers, transposition ciphers, and/or any other scheme which may be used to encode information such that only authorized parties may decode it. One or more encryption keys for the one or more encryption schemes may be included in the access parameters for the region 132.

In a third example, the application logic, the client logic, the allocation logic, the communication interfaces, the memory controllers, the storage controllers, and/or the backing stores may perform error detection and/or error correction upon the data being written to the region 132 and/or the data being read from the region 132. Error detection and/or error correction may be performed using any one or more error detection and/or error correction schemes, such as repetition codes, parity bits, checksums, cyclic redundancy checks, cryptographic hash functions, error correcting codes, forward error correction, convolutional codes, block codes, Hamming codes, Reed-Solomon codes, Turbo codes, low-density parity-check codes (LDPC), and/or any other scheme which may be used to detect and/or correct data errors.

The application logic 314, the client logic 312, and/or the allocation logic 412 may perform data monitoring on the data being read and/or written to the region 132. Alternatively or in addition, the communication interfaces, the memory controllers, the storage controllers, and/or the backing stores may perform data monitoring. Data monitoring may include observing the data being read and/or written. In an example, the application logic, the client logic, the allocation logic, the communication interfaces, the memory controllers, the storage controllers, and/or the backing stores may perform virus scanning on data being read from and/or written to the region 132. In a second example, the application logic, the client logic, the allocation logic, the communication interfaces, the memory controllers, the storage controllers, and/or the backing stores may perform malware detection on data being read from and/or written to the region 132. In a third example, the application logic, the client logic, the allocation logic, the communication interfaces, the memory controllers, the storage controllers, and/or the backing stores may perform policy enforcement, such as monitoring for forbidden data patterns and/or strings, on data being read from and/or written to the region 132. In a fourth example, the application logic, the client logic, the allocation logic, the communication interfaces, the memory controllers, the storage controllers, and/or the backing stores may perform data indexing on data being read from and/or written to the region 132. For example an index for a first region may be created in a second region, the index providing fast lookup of data in the first region.

Presence of management servers, memory appliances, and/or clients may be detected automatically by the allocation logic 412, the region access logic 144, and/or the client logic 312. When the management server 107, the memory appliance 104, and/or the client 102 is detected by the allocation logic 412, the region access logic 144, and/or the client logic 312, it may become known to the allocation logic 412, the region access logic 144, and/or the client logic 312 that detected it. To facilitate being detected, the allocation logic 412, the region access logic 144, and/or the client logic 312 may transmit a hello message upon one or more interconnects 106 upon startup, periodically, and/or upon receiving a presence detection request message. Upon receiving a hello message, the allocation logic 412, the region access logic 144, and/or the client logic 312 may detect the management server 107, the memory appliance 104, and/or the client 102 that sent the hello message. To facilitate detecting management servers, memory appliances, and/or clients, the allocation logic 412, the region access logic 144, and/or the client logic 312 may send a presence detection request message. A presence detection request message may include information about the characteristics or configurations of the management servers and/or memory appliances including the allocation logic 412 and/or region access logic 144 that may respond. Alternatively or in addition, a presence detection request message may include an indication of whether only management servers, only memory appliances, only clients, or some combination of these may respond.

Alternatively or in addition, the allocation logic 412, the region access logic 144, and/or the client logic 312 may register the presence of the corresponding management servers, memory appliances, and/or clients with one or more registration servers. A registration server may be an Infini-Band subnet administrator, a Domain Name System (DNS) server, a Multicast DNS (mDNS) server, Service Location Protocol (SLP) directory agent, an Active Directory Server, or any other server capable of receiving and/or distributing information about management servers, memory appliances, and/or clients. Alternatively or in addition, the allocation logic 412, the region access logic 144, and/or the client logic 312 may include information about the characteristics and/or configuration of the corresponding management servers, memory appliances, and/or clients when registering their presence with the registration server. The allocation logic 412, the region access logic 144, and/or the client logic 312 may detect management servers, memory appliances, and/or clients by querying the one or more registration servers.

Alternatively or in addition, presence of management servers and/or memory appliances may be specified by an administrator using a user interface. The user interface may be a graphical user interface, a web interface, a command-line interface, an application programming interface (API), and/or any other type of interface or combination of interfaces known now or later discovered.

Management servers may be associated with one or more memory appliances. Memory appliances may be associated with one or more management servers. Management servers may additionally be associated with zero or more other management servers. For example, the management server 107 may be associated with another management server that may function as a backup management server in case the management server 107 fails. The backup management server may maintain copies of data of the management server 107, including, but not limited to, the external memory allocation metadata 414 and/or the region metadata 215. The backup management server may further have a copy of the backing store 460 of the management server 107. The backup management server may obtain such copies of data at a predetermined schedule. Alternatively or in addition, the backup management server may obtain a copy of the data in response to an event, such as modification of the data of the management server 107. Alternatively or in addition, the backup management server may obtain a copy of the data from the management server 107 in response to a request from an administrator, such as via the user interface. The backup management server 107 may obtain data of the management server 107 as described elsewhere in this disclosure.

Associations between management servers and memory appliances may be specified by an administrator using a second user interface, which may be part of the user interface described earlier. The second user interface may be a graphical user interface, a web interface, a command-line interface, an API, and/or any other type of interface or combination of interfaces known now or later discovered.

The memories of the memory appliances associated with the management server 107 may be part of a memory pool. Alternatively or in addition, the memories of the memory appliances known to the allocation logic 412 of the management server 107 may be part of the memory pool. Alternatively or in addition, the memories of the memory appliances associated with multiple management servers and/or known to multiple allocation logics may be part of the memory pool. The pool of memory, or the memory pool, may be a collection of allocatable memory that spans one or more memory appliances.

Alternatively or in addition, associations between management servers and memory appliances may be determined automatically. Automatic associations between management servers and memory appliances may be determined based upon characteristics or configurations of the management servers, the memory appliances, or both. Characteristics or configurations of the management server 107, the memory appliance 104, and/or the client 102 may include hardware revisions, firmware revisions, software revisions, protocol revisions, physical location, logical location, network location, network topology, network bandwidth, network capacity, network utilization, logical grouping, labels, names, server/appliance health, server/appliance utilization, server/appliance overall performance rating, processor type, number of processors, processor speed, memory bandwidth, memory capacity, memory utilization, memory health, backing store presence, backing store bandwidth, backing store input/output operations per second (IOPS), backing store latency, backing store capacity, backing store utilization, backing store health, battery presence, battery type, battery chemistry, battery capacity, battery utilization, battery % charged, battery time remaining, battery health, or any other characteristic or combination of characteristics of the management server 107, the memory appliance 104, and/or the client 102. In an example, the allocation logic 412 may automatically associate the management server 107 with memory appliances in the same physical rack. In another example, the allocation logic 412 may automatically associate the management server 107 with memory appliances sharing the same protocol version. In another example, the allocation logic 412 may automatically associate the management server 107 with memory appliances with appliance health, memory health, backing store health, and/or battery health above or below a threshold or set of thresholds. The thresholds may be configurable by the administrator via the user interface, or may be predetermined when the management server starts up.

The allocation logic 412 may transmit region access logic requests to the region access logic 144 included in one or more memory appliances. The memory appliances including the region access logic 144 to which the requests are sent may be associated with the management servers including the allocation logic 412 and/or known by the allocation logic 412. For example, region access logic requests received by the region access logic 144 may include requests to create the region 132, requests to resize the existing region 214, requests to restore contents of the region 132 from the backing store 260, requests to get the status of the memory 210 included in the memory appliance 104, requests to get health status from the memory appliance 104, requests to persist the region 132 to the backing store 260 and remove the region 132 from the memory 210, requests to destroy the region 132, requests to get a list of available regions, requests to get information for the region 132, requests to modify settings for the region 132, requests to migrate the region 132, and/or any other request related to the memory appliance 104 and/or the regions included in the memory 210 of the memory appliance 104.

The region access logic requests may be communicated over any communications protocol and/or interface capable of carrying messages. For example, the region access logic requests may be carried over UDP datagrams, a TCP connection, an SSL connection, InfiniBand reliable connections, RoCE, iWARP, HTTP, or any other communications protocol known now or later discovered. Alternatively or in addition, the region access logic requests may be carried over remote procedure calls, such as using XML-RPC, SOAP, CORBA, Java Remote Method Invocation (Java RMI), and/or any other remote procedure call protocol. Alternatively or in addition, the region access logic requests may be carried over a communication protocol based on client-side memory access, such as by writing messages into a buffer on the memory appliance 104 via client-side-memory access. Alternatively or in addition, the region access logic requests may be carried via invoking methods in an API. For example, if the allocation logic 412 and region access logic 144 are co-located or combined, the region access logic requests may be methods in an API. The allocation logic 412 and region access logic 144 may be co-located in examples where the memory appliance 104 also functions as the management server 107, or, alternatively, the management server 107 also functions as the memory appliance 104.

Upon receiving a request to create the region 132, the region access logic 144 may allocate a portion of the memory 210 included in the memory appliance 104 for the region 132. Allocating a portion of the memory 210 may include initializing the contents of the allocated memory. Alternatively or in addition, the memory being allocated may be pre-initialized, such as by an operating system. Alternatively or in addition, the memory being allocated may be partially pre-allocated, such as a free list including one or more portions of pre-allocated and/or pre-initialized memory. Alternatively or in addition, the region access logic 144 may configure the communication interface 230 for the region 132 without allocating the entire portion of the memory for the region 132 and/or without initializing the contents of the memory. The region access logic 144 may configure the communication interface 230 to treat unallocated and/or un-initialized portions as not present. Attempting to access data that is not present using client-side memory access may fail. Alternatively or in addition, attempting to access data that is not present using client-side memory access may cause the processor 240 to be notified. Upon being notified, the processor 240 may take some action related to the attempt to access data that is not present, such as allocating a portion of the memory 210 to satisfy the attempt to access data that is not present and/or initializing the portion of the memory. The region access logic 144 may also associate an identifier with the region 132. The identifier may be chosen by the region access logic 144 or it may be included in the request to create the region 132. Additionally, the region access logic 144 may associate metadata with the region 132. The region access logic 144 may respond to the request to create the region 132 with a response message. The response message may include the identifier associated with the region 132 and/or a status, indicating whether the operation was successful.

Upon receiving a request to resize the existing region 214, if the region 132 is being expanded, the region access logic 144 may allocate a portion of the memory 210 of the memory appliance 104. Allocating a portion of the memory 210 may include initializing the contents of the allocated memory. Alternatively or in addition, the memory being allocated may be pre-initialized, such as by an operating system. Alternatively or in addition, the memory being allocated may be partially pre-allocated, such as a free list including one or more portions of pre-allocated and/or pre-initialized memory. The size of the portion of the memory may be related to the size of the expanded region minus the size of the existing region 214. For example, the size of the portion of the memory may be the size of the expanded region minus the size of the existing region 214 rounded up to the nearest unit of allocation, such as a page, a huge page, a slab, and/or any other unit of allocation. The units of allocation may have respective predetermined sizes. The predetermined sizes may vary, such as based on an operating system being used by the client 102, the memory appliance 104, and/or the management server 107. Alternatively or in addition, the size of the portion of the memory may be specified by the request to resize the existing region 214. Alternatively or in addition, the request to resize the existing region 214 may specify an offset within the region 132 where the allocated portion may appear. For example, the request to resize the existing region 214 may be re-allocating a portion of the region 132 that was previously de-allocated by a different request to resize the same region 214. The region access logic 144 may assign the allocated portion to the region 132. The region access logic 144 may update the region metadata 215 to include references to the allocated portion of the memory 210.

Upon receiving the request to resize the existing region 214, if the region 132 is being contracted, the region access logic 144 may update the region metadata 215 to remove references to a portion of the memory allocated to the region 132 and/or may de-allocate the portion of the memory. De-allocating may include listing the de-allocated portions on the free list. The portion of the memory may be the portion at the logical end of the region 132, at the logical beginning of the region 132, and/or at any other logical location within the region 132. The portion of the region to be removed may be specified by the request to resize the existing region 214. For example, the request to resize the existing region 214 may specify that the data at the end of the region 132 may be discarded. Alternatively or in addition, the request to resize the existing region 214 may specify that the data at the beginning of the region 132 may be discarded. Discarding data at a location other than the end of the region 132 may cause the offsets of data after the discarded data to change. For example, removing 100 MiB (mebibyte) from the region starting at an offset of 200 MiB may cause data that previously occurred at an offset of 300 MiB to instead occur at an offset of 100 MiB. Alternatively, discarding data at a location other than the end of the region 132 may cause the offsets of data after the discarded data to stay the same. The region access logic 144 may configure the communication interface 230 to treat the discarded data as not-present. Attempting to access data that is not present using client-side memory access may fail. Alternatively, attempting to access data that is not present using client-side memory access may cause the processor 240 to be notified. Upon being notified, the processor 240 may take some action related to the attempt to access data that is not present, such as allocating a portion of the memory and/or initializing the portion to satisfy the attempt to access the data that is not present.

Upon receiving a request to restore the contents of the region 132 from the backing store 260, the region access logic 144 may allocate a portion of the memory 210 included in the memory appliance 104 for the region 132. The region access logic 144 may copy the contents of persisted data related to the region 132 into the allocated memory. Alternatively or in addition, the region access logic 144 may associate portions of the backing store 260 with portions of the region 132 without immediately allocating the portion of the memory and/or without immediately copying the contents by configuring the communication interface 230 to treat the portions of the region 132 as not present. Attempting to access data that is not present using client-side memory access may fail. Alternatively, attempting to access data that is not present using client-side memory access may cause the processor 240 to be notified. Upon being notified, the processor 240 may take some action related to the attempt to access data that is not present, such as allocating a portion of the memory to satisfy the attempt to access data that is not present, initializing the portion of the memory, and/or copying the contents of persisted data related to the portion into the portion. The region access logic 144 may respond to the request to restore the contents of the region 132 from the backing store 260 with a response message. The response message may include the identifier associated with the region 132 and/or a status, indicating whether the operation was successful.

Upon receiving a request to get the status of the memory 210 included in the memory appliance 104, the region access logic 144 may respond to the request with a response message. The response message may include one or more attributes of the memory 210 included in the memory appliance 104. The attributes may include the total memory available to hold regions, the amount of memory currently in use by existing regions, the amount of memory available to hold additional regions, and/or any other attributes of the memory 210 included in the memory appliance 104.

Upon receiving a request to get health status from the memory appliance 104, the region access logic 144 may respond to the request with a response message. The response message may include one or more attributes describing the health of the memory appliance 104, of components included in the memory appliance 104, and/or of components connected to the memory appliance 104. Examples of health that may be described by the attributes include temperatures, voltages, cooling system health, backing store status, memory health, CPU health, battery capacity, projected battery run time, or any other hardware, firmware, or software status and/or health relevant to the health of the memory appliance 104. Temperatures may include CPU temperatures, integrated circuit temperatures, circuit board temperatures, chassis intake temperatures, chassis output temperatures, power supply temperatures, uninterruptible power supply (UPS) temperatures, battery temperatures, backing store temperatures, and/or any other temperatures relevant to the health of the memory appliance 104. Voltages may include CPU voltages, integrated circuit voltages, circuit board voltages, power supply input voltages, power supply output voltages, UPS input voltages, UPS output voltages, battery voltages, and/or any other voltages relevant to the health of the memory appliance 104. Cooling system health may include fan speeds, liquid coolant temperatures, liquid coolant flow rates, facility cooling health, and/or any other status related to the ability to maintain stable temperatures. Backing store status may include status of individual storage devices included in the backing store, status of hardware and/or software storage controllers, status of logical volumes included in the storage devices, status of logical associations between storage devices, status of logical associations between logical volumes, and/or any other status related to the ability to reliably store data in the backing store 260. Logical associations may include software or hardware mechanisms used to aggregate storage devices or logical volumes and/or to provide redundancy and/or resiliency. For example, a logical association may be a redundant array of independent disks (RAID). Memory health may include number and/or source of memory errors, memory redundancy status, and/or any other status related to the ability to reliably store data in the memory. Memory errors may include recoverable error correcting code (ECC) errors, unrecoverable ECC errors, rank spared indications, mirror broken indications, and/or any other errors and/or indications reported by the memory and/or memory controller. CPU health may include CPU errors, CPU voltage/frequency scaling mode, and/or any other status related to the CPU's ability to reliably execute instructions. CPU errors may include hardware watchdog expirations, machine checks, cache ECC errors, processor faults, and/or any other error or indication reported by the CPU and/or CPU monitoring hardware.

Upon receiving a request to persist the region 132 to the backing store 260 and remove it from memory 210, the region access logic 144 may copy the contents of the region 132 to a portion of the backing store 260. The portion of the backing store 260 may be determined at the time the request to persist the region 132 to the backing store 260 and remove it from the memory 210 is received. Alternatively, the portion may have been determined in advance, such as when the region 132 was created, and/or when the region 132 was configured. After the contents of the region 132 are copied to the portion of the backing store 260, the region access logic 144 may de-allocate the portion of the memory included in the memory appliance 104 for the region 132. De-allocating may include listing the de-allocated portions on a free list, which indicates portions of the memory 210 that have not been allocated to any particular region. Alternatively or in addition, as the contents of portions of the region 132 are copied to the backing store 260, the region access logic 144 may selectively de-allocate the portions of the region 132 that have already been copied to the backing store 260. Alternatively or in addition, if portions of the region 132 have already been copied to the backing store 260 prior to receiving the request to persist the region 132 to the backing store 260 and remove it from memory 210, the region access logic 144 may not copy the portions of the region 132 that have already been copied to the backing store 260. The region access logic 144 may respond to the request to persist the region to the backing store 260 and remove it from memory 210 with a response message. The response message may include the identifier associated with the region 132 and/or a status, indicating whether the operation was successful.

Upon receiving a request to destroy the region 132, the region access logic 144 may de-allocate the portion of the memory included in the memory appliance 104 for the region 132. De-allocating may include listing the de-allocated portions on the free list. Alternatively or in addition, the region access logic 144 may delete any persisted data related to the region 132 included in the backing store 260. The region access logic 144 may respond to the request to destroy the region 132 with a response message. The response message may include the identifier associated with the region 132 and/or a status, indicating whether the operation was successful.

Upon receiving a request to get a list of available regions, the region access logic 144 may respond to the request with a response message. The response message may include a number of available regions and/or attributes related to the available regions. Available regions may include regions that are included in the memory 210, regions that are included in the backing store 260, and/or regions that are partially included in the memory 210 and/or backing store 260. The attributes related to an available region, such as the region 132, may include the identifier associated with the region, the size of the region, the status of the region, information about external memory allocations that reference the region, and/or any other information related to the region. The status of the region 132 may include one or more indications of whether the region is included in the memory 210, whether the region 132 is included in the backing store 260, whether the contents of the region 132 are being persisted to the backing store 260, whether the contents of the region 132 are being restored from the backing store 260, and/or whether the contents of the region 132 are being transferred to or from another memory appliance or storage device. Information about an external memory allocation may include an identifier for the external memory allocation, information about the external memory allocation, and/or information about the region's role in the external memory allocation. For example, an external memory allocation may include metadata describing a logical relationship between the regions referenced by the external memory allocation. In one example, the logical relationship could be a concatenation of regions located in different memory appliances, the metadata describing the logical relationship may include an indication that concatenation is in use and/or a logical address within the external memory allocation at which the region's data logically exists. Alternatively or in addition, the logical relationship could be a striping relationship, such as RAID-0; a mirroring relationship, such as RAID-1; a parity relationship, such as RAID-2, RAID-3, RAID-4, RAID-5, or RAID-6; a partial data redundancy relationship, a combination of relationships, such as striping with mirroring; or any other relationship between regions known now or later discovered.

Upon receipt of a request to get information for the region 132, the region access logic 144 may respond to the request with a response message. The response message may include information related to the region 132. The information related to the region 132 may include all of or a portion of the region metadata 215. Alternatively or in addition, the information related to the region 132 may be derived from the region metadata 215. Alternatively or in addition, the information related to the region 132 may be different depending upon parameters included in the request to get information for the region 132. For example, the parameters may include an indication of which portion of the metadata 215 may be included in the information related to the region 132.

Upon receiving a request to modify settings for the region 132, the region access logic 144 may update the region metadata 215 to reflect the modified settings. For example, the request to modify settings for the region 132 may set a human readable label to be associated with the region 132, modify access parameters, and/or modify other portions of the region metadata 215. The region access logic 144 may restrict which parts of the region metadata 215 may be modified. For example, the region access logic 144 may use the access parameters to control which parts of the region metadata 215 may be modified. If the region access logic 144 determines that the requested changes are not allowed, the request to modify settings of the region 132 may fail. In another example, the request to modify settings of the region 132 may include a request to enable replication and/or may include identifiers for regions and/or memory appliances to which the data of the region 132 of the memory appliance 104 may be replicated. When replication is enabled, the observer logic 218 may replicate affected portions of the region 132 to the regions and/or memory appliances indicated in the request to modify settings for the region 132 using the methods described throughout. The region access logic 144 may respond to the request to modify settings for the region 132 with a response message. The response message may include the identifier associated with the region 132, information related to the modified region metadata 215, and/or a status, indicating whether the operation was successful.

Using information provided by the allocation logic the client logic may access one or more regions using client-side memory access. The client may present a data interface to the application logic. The data interface may take many forms and/or may depend upon the preferences of the application logic and/or of the users. Some examples of data interfaces may include: an API, block-level interface, a character-level interface, a memory-mapped interface, a memory allocation interface, a memory swapping interface, a memory caching interface, a hardware-accessible interface, a graphics processing unit (GPU) accessible interface and/or any other interface used to access the data and/or metadata of the memory appliance, the management server, the region, the external memory allocation, and/or the regions referenced by the external memory allocation. Alternatively or in addition, the data interface may include multiple interfaces. The data interface may be a data interface unit. The functionality of any of the data interfaces may be provided using all of or a portion of the functionality of any one or more of the other data interfaces. For example, a block-level interface may use methods of an API in order to retrieve and/or manipulate external memory allocations and/or the regions referenced by an external memory allocation. Alternatively, or in addition, an API may include methods to manipulate a block device interface.

In a first example, the data interface may include an API. An API may provide methods for the application logic to invoke that manipulate a region. The methods for the application logic to invoke that manipulate a region may include methods that manipulate data included in the region, methods that manipulate the metadata associated with the region, methods that manipulate the access controls for the region, and/or any other methods related to the region. For example, a method may enable the application logic to read or write data to a specific location within the region. Alternatively, or in addition, an API may provide methods for the application logic to invoke that manipulate an external memory allocation. The methods for the application logic to invoke that manipulate an external memory allocation may include methods that manipulate data included in the regions referenced by the external memory allocation, methods that manipulate the metadata associated with the regions, methods that manipulate the metadata associated with the logical relationships between the regions, methods that manipulate the metadata associated with the external memory allocation, methods that manipulate the access controls for the regions, methods that manipulate the access controls for the external memory allocation, and/or any other methods related to the external memory allocation, the logical relationships between the regions, and/or the regions referenced by the external memory allocation. In an example, a method may enable the application logic to read or write data to a specific location within the external memory allocation. Reading data from a first location within an external memory allocation may cause data to be read from one or more second locations within one or more regions referenced by the external memory allocation. Writing data to a first location within an external memory allocation may cause data to be written to one or more second locations within one or more regions referenced by the external memory allocation. The second locations and the regions may be determined based upon the logical relationships between the regions. In a second example, a method may enable the application logic to run a consistency check upon an external memory allocation that uses a parity-based logical relationship. In a third example, a method may facilitate the application logic to register the memory of the client and/or a portion of the memory with one or more communication interfaces. Registering memory may cause subsequent client-side memory access operations using the registered memory to proceed more quickly and/or more efficiently than operations not using the registered memory.

In a second example, the data interface may include a block-level interface. The block-level interface may provide block-level access to data of a region. Alternatively or in addition, the block-level interface may provide block-level access to data of one or more of the regions referenced by an external memory allocation. Alternatively or in addition, the block-level interface may provide block-level access to data of the external memory allocation. Block-level access to data may include reading data from or writing data to a consistently-sized and/or aligned portion of a region or an external memory allocation. The client logic may provide block-level access using a block device interface. Alternatively, or in addition, the client logic may provide block-level access using any storage protocol now known or later discovered. A storage protocol may be any communications protocol used to transfer data between a block storage device, interface, or system, such as the block-level interface or any other data interface, and a device or system, such as the client or another client, that stores data in, and/or retrieves data from, the block storage device, interface, or system. A storage protocol may be implemented, for example, using one or more software and/or hardware storage controllers. The storage protocol and electrical characteristics of the hardware storage controller may be part of a common standard. In one example, the storage protocol may be the universal serial bus mass storage device class (USB MSC or UMS), which is a set of computing communications protocols defined by the USB Implementers Forum that runs on a hardware bus, such as the one or more interconnects, that conforms to the USB standard. In a second example, the storage protocol may be the Small Computer System Interface (SCSI) command protocol. In a third example, the storage protocol may be the Serial Advanced Technology Attachment (SATA) protocol. Additional examples of the storage protocol include Serial Attached SCSI (SAS) and Internet Small Computer System Interface (iSCSI). Alternatively or in addition, the block-level interface may provide block-level access using any storage protocol that transfers data with a data transfer protocol, such as SCSI over Fiber Channel, SCSI RDMA Protocol (SRP) over Remote Direct Memory Access (RDMA), iSCSI over TCP/IP, or any other combination of storage protocol and data transfer protocol known now or discovered in the future. Alternatively, or in addition, the block-level interface may provide block-level access by emulating the storage protocol and/or data transfer protocol. In one example, the block-level interface may provide block-level access by providing a SCSI command interface to the application logic. In a second example, the block-level interface may provide block-level access using a storage protocol with an emulated data transfer protocol, such as with a virtualized communication interface.

In a third example, the data interface may include a character-level interface. The character-level interface may provide character-level and/or byte-level access to data of a region. Alternatively or in addition, the character-level interface may provide character-level and/or byte-level access to data of one or more of the regions referenced by an external memory allocation. Alternatively or in addition, the character-level interface may provide character-level and/or byte-level access to data of the external memory allocation. The client logic may provide character-level access using a character device interface. Character-level access may enable the application logic to read and/or write to character-aligned portions of the external memory allocation or of the regions referenced by the external memory allocation. Byte-level access may enable the application logic to read and/or write to byte-aligned portions of the external memory allocation or of the regions referenced by the external memory allocation. Alternatively or in addition, the character-level interface may enable the application logic to seek to a specified location within the external memory allocation or the regions referenced by the external memory allocation. Seeking to a specified location may cause subsequent attempts to read and/or write to the external memory allocation or the regions referenced by the external memory allocation to start at the most recently seeked-to location. Alternatively, or in addition, attempts to read and/or write to the external memory allocation or the regions referenced by the external memory allocation may start at a location after the most recently read and/or written portion.

In a fourth example, the data interface may include a memory-mapped interface. The memory mapped interface may enable the application logic to map all of or a portion of a region, an external memory allocation and/or of one or more regions referenced by the external memory allocation into a virtual address space, such as the virtual address space of the application logic. The memory-mapped interface may include an API. Alternatively, or in addition, the memory-mapped interface may include and/or utilize a block-level interface and/or a character-level interface. In one example, the memory-mapped interface may enable the application logic to map all of or a portion of a block device interface into a virtual address space, such as the virtual address space of the application logic.

The memory mapped interface may include a page fault handler method. The page fault handler method may be executed when the application logic attempts to access a first portion of the virtual address space. The first portion may be configured to trigger the page fault handler when accessed. The first portion may be a page of the virtual address space. Alternatively, or in addition, the first portion may be included in the mapped portion of the virtual address space. The page fault handler may perform client-side memory access to read a second portion of the external memory allocation and/or of one or more regions referenced by the external memory allocation into a third portion of the memory of the client. The third portion may be a page of the memory of the client. Alternatively, or in addition, the page fault handler may allocate the third portion of the memory of the client. The page fault handler may map the first portion of the virtual address space to the third portion of the memory. The first portion may correspond to the second portion. For example, the offset of the first portion within the mapped portion of the virtual address space may equal the offset of the second portion within the external memory allocation or the regions referenced by the external memory allocation. Alternatively, or in addition, the second portion may include a fourth portion corresponding to the third portion. The portion of the second portion not included in the fourth portion may be considered a fifth portion. For example, the page fault handler method may determine based upon a pattern of calls to the page fault handler method that the fifth portion of the external memory allocation and/or of the one or more regions may be needed soon and therefore, may be read into the memory in anticipation, such as with a read-ahead predicting algorithm.

Alternatively, or in addition, the memory mapped interface may include a background process. The background process may periodically flush dirty pages. Flushing dirty pages may include performing client-side memory access to write the data from the dirty pages to the corresponding locations within the external memory allocation and/or the one or more regions referenced by the external memory allocation. Dirty pages may be pages included in the memory of the client which have been written to by the application logic and/or the client logic since they were last read from or written to the external memory allocation and/or the one or more regions referenced by the external memory allocation.

Alternatively, or in addition, the memory mapped interface may include a page evicting method. Pages to be evicted may include the one or more pages of the memory used to hold the third portion of the memory of the client. The page evicting method may be executed when the memory-mapped interface determines that the pages to be evicted are unlikely to be accessed again soon, when the memory-mapped interface determines that the pages to be evicted are needed to hold data for other executions of the page fault handler method, and/or when the pages to be evicted are needed to hold data for any other purpose. If one or more of the pages to be evicted are dirty pages, the page evicting method may perform client-side memory access to write data from the dirty pages to a corresponding portion of the external memory allocation and/or the regions referenced by the external memory allocation. The page evicting method may update metadata to indicate that the pages to be evicted may be re-used for other purposes, such as by the page fault handler method.

In a fifth example, the data interface may include a memory allocation interface. The memory allocation interface may include an API. The memory allocation interface may include one or more methods that enable the application logic to allocate individual buffers, such as malloc( ), mmap( ), brk( ), and/or sbrk( ) in C programs. For example, an application may allocate a buffer to hold an integer, an array of integers, a character, a string, and/or any other data. Alternatively, or in addition, the memory allocation interface may include one or more methods that enable an application-level memory allocator to allocate slabs of memory, such as mmap( ) A slab of memory may include one or more pages. The one or more pages included in the slab may be contiguous in a physical address space and/or in a virtual address space. A slab of memory may be further sub-divided by the application-level memory allocator. For example, the application-level memory allocator may enable the application logic to allocate individual buffers from portions of the slab of memory. The memory allocation interface may utilize a memory-mapped interface. For example, allocating the individual buffers and/or allocating the slabs of memory may include mapping all of or a portion of an external memory allocation and/or of one or more regions referenced by the external memory allocation into a virtual address space, such as the virtual address space of the application. The virtual address of an individual buffer and/or of a slab may be included in a portion of the virtual address space corresponding to a portion of the external memory allocation and/or of the regions. Alternatively, or in addition, allocating the individual buffers and/or allocating the slabs of memory may include creating one or more external memory allocations and/or regions. The memory allocation interface may be made available selectively to one or more application logics. Alternatively, or in addition, the memory allocation interface may be made available to all application logics.

In a sixth example, the data interface may include a memory swapping interface. The memory swapping interface may include an API. The memory swapping interface may enable the application logic 122 to remove infrequently accessed data from primary memory. In one example implementation, the application logic 122 may be an operating system, or a portion of an operating system, such as a kernel and/or a memory management subsystem. The memory swapping interface may include a block-level interface. The memory swapping interface may include a swap device. Alternatively, or in addition, the memory swapping interface may include a character-level interface. For example, the memory swapping interface may emulate a swap file using a character device interface and/or a block device interface. The memory swapping interface may be made available to all applications in the client 130, such as the application logic 122, or to a subset of applications. The memory swapping interface may include a transcendental memory interface. For example, the memory swapping interface may include a front-swap interface. The front-swap interface may include one or more methods to initialize the front-swap interface, to store a page, to get a page, to invalidate a page, and/or to invalidate multiple pages.

A method to initialize the front-swap interface may initialize metadata. The metadata may include offsets within the external memory allocations and/or the regions for where to find the data from zero or more pages. The metadata may include one or more data structures to facilitate fast lookup of the offsets. For example, the metadata may include a hash table, a red-black tree, a radix tree, and/or any other data structure known now or later discovered. The one or more data structures may be indexed and/or may include an index based upon an identifier for the zero or more pages. The metadata may be included in the memory of the client. Alternatively, or in addition, the metadata may be included in the external memory allocations, regions referenced by the external memory allocations, in the region metadata 215, and/or in the external allocation metadata.

A method to store a page may perform client-side memory access to write data from the page to a corresponding portion of one or more external memory allocations and/or one or more regions referenced by the one or external memory allocations. Alternatively, or in addition, the method to store a page may update metadata indicating the presence and/or offset of the data from the page in the external memory allocations and/or the regions. The method to store a page may perform client-side memory access to read and/or write the metadata from/to a location within the external memory allocations and/or regions referenced by the external memory allocations.

A method to get a page may perform client-side memory access to read data into the page from a corresponding portion of the external memory allocations and/or the regions referenced by the external memory allocations. The method to get a page may utilize the metadata and/or the one or more data structures to determine the offset for where to find the data from the page. The method to get a page may perform client-side memory access to read and/or write the metadata from/to a location within the external memory allocations and/or regions referenced by the external memory allocations.

A method to invalidate a page may update metadata indicating the non-presence of the data from the page in the external memory allocations and/or the regions. Updating the metadata may include updating the one or more data structures. The method to invalidate a page may perform client-side memory access to read and/or write the metadata from/to a location within the external memory allocations and/or regions referenced by the external memory allocations. Alternatively, or in addition, the method to invalidate a page may perform client-side memory access to overwrite data from the page to a corresponding portion of the external memory allocations and/or the regions referenced by the external memory allocations.

A method to invalidate multiple pages may update metadata indicating the non-presence of the data from the multiple pages in the external memory allocation and/or the regions. The multiple pages may be all pages associated with a specified swap area, swap device, swap partition, and/or swap file. Updating the metadata may include updating the one or more data structures. For example, updating the metadata may include emptying and/or removing one or more data structures. The method to invalidate a page may perform client-side memory access to read and/or write the metadata from/to a location within the external memory allocations and/or regions referenced by the external memory allocations. Alternatively, or in addition, the method to invalidate multiple pages may perform client-side memory access to overwrite data from the multiple pages to one or more corresponding portions of the external memory allocations and/or the regions referenced by the external memory allocations.

Figure 6A:
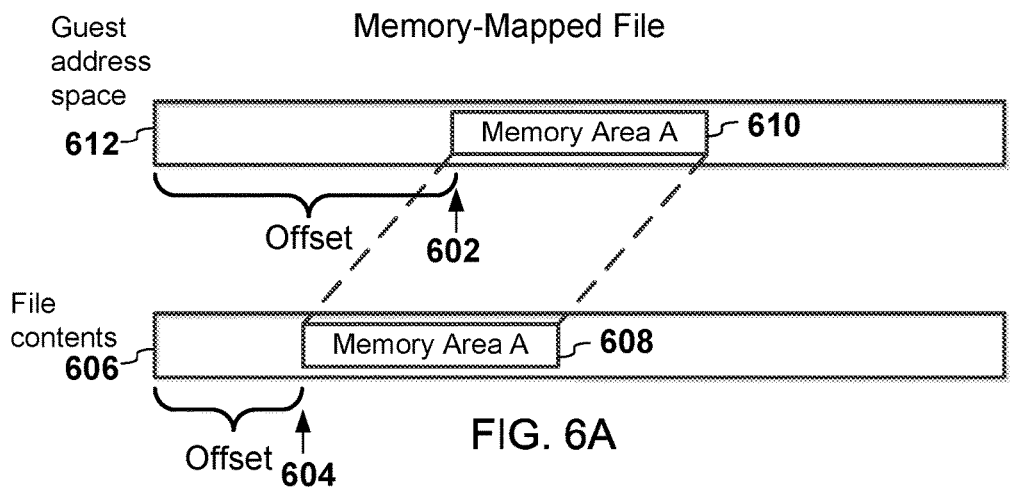
FIG. 6A illustrates a data mapping diagram of an example mapping from guest physical addresses to file offsets.

FIG. 6A illustrates a data mapping diagram of an example mapping from guest addresses, such as a starting address 602, to file offsets, such as a starting file offset 604. The guest addresses may be, for example, guest physical addresses in the case of a virtual machine and virtual addresses in the case of an operating system-level virtualization instance. A portion 608 of the contents 606 of the file 150 may be mapped to a corresponding portion 610 of a guest address space 612. For example, the portion 608 of the contents 606 of the file 150 that is designated Memory Area A in FIG. 6A may be mapped to the corresponding portion 610 in the guest address space 612 that is designated Memory Area A in FIG. 6A. The portions 608 and 610 may be at the same or different offsets in the file 150 and the guest address space 612. For example, in the example shown in FIG. 6A, the starting file offset 604 is different than the offset of the starting address 602 in the guest address space 612.

The guest address space 612 is in an address space of the virtual machine or the operating system-level virtualization. Similarly, guest physical addresses are addresses that may be used by an application executing in the virtual machine or in the operating system-level virtualization.

Figure 6B:
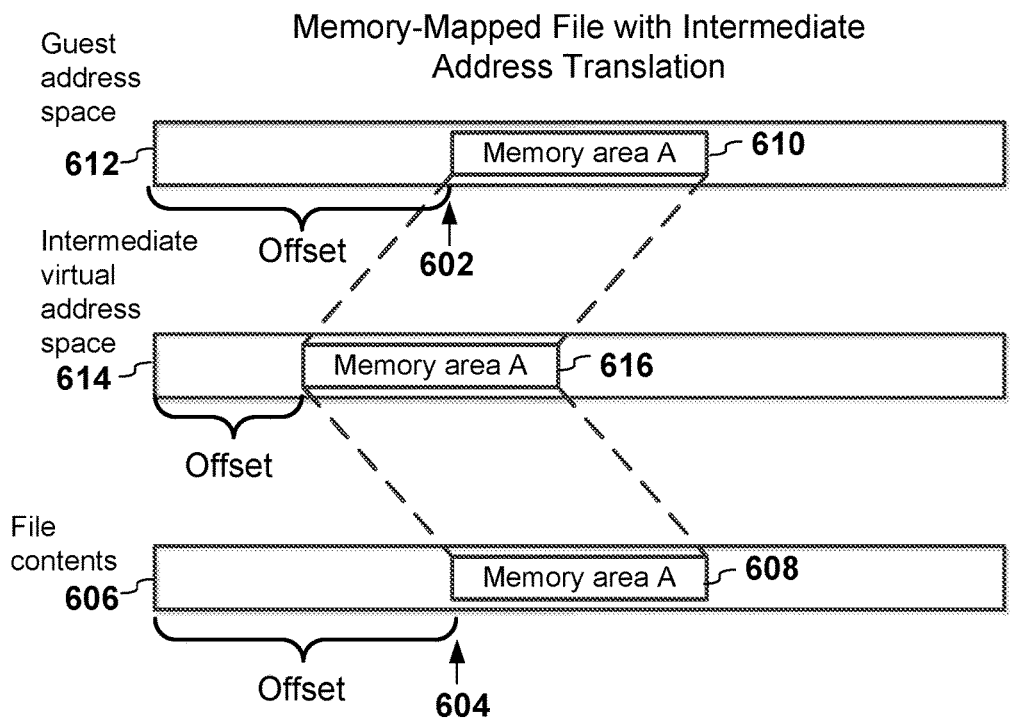
FIG. 6B illustrates a data mapping diagram of an example mapping from guest physical addresses to file offsets by way of an intermediate virtual address space.

FIG. 6B illustrates a data mapping diagram of an example mapping from guest physical addresses, such as the starting address 602, to file offsets, such as the starting file offset 604, by way of an intermediate virtual address space 614. The portion 608 of the contents 606 of the file 150 may be mapped to a corresponding portion 616 of the intermediate virtual address space 614. For example, the portion 608 of the contents 606 of the file 150 that is designated Memory Area A in FIG. 6B may be mapped to the corresponding portion 616 in the intermediate virtual address space 614 that is designated Memory Area A in FIG. 6B. The portion 616 of the intermediate virtual address space 614 may be mapped to the corresponding portion 610 of the guest address space 612. For example, the portion 616 of the intermediate virtual address space 614 that is designated Memory Area A in FIG. 6B may be mapped to the corresponding portion 610 in the guest address space 612 that is designated Memory Area A in FIG. 6B. The portions may be at the same—or different—offsets in the file 150, the intermediate virtual address space 614, and the guest address space 612. In one example, the intermediate virtual address space 614 may be a virtual address space of a process logic operating with an operating system, such as the operating system of the client logic.

Figures 7A, 7B:
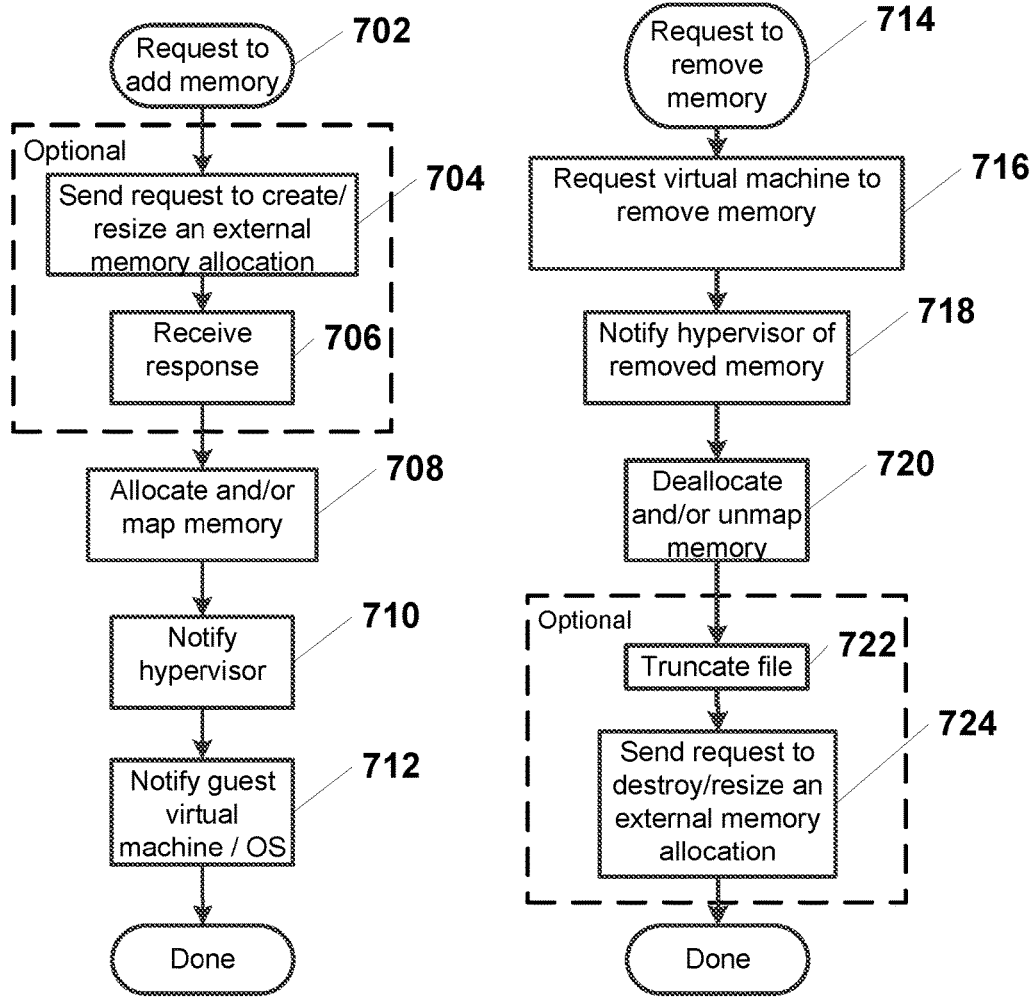
FIG. 7A illustrates a flow diagram of an example logic of a system handling a memory add request for a virtual machine.
FIG. 7B illustrates a flow diagram of an example logic of a system handling a memory remove request for a virtual machine.

FIG. 7A illustrates a flow diagram of an example logic of the system 100 handling a memory add request 702 for a virtual machine. A request to add memory may be received (704) with the client logic, starting the process. The request to add memory, which is represented by the memory add request 702, may be initiated by a human operator, such as through a user interface, and/or may be initiated by some other logic, such as the application logic and/or the allocation logic. For example, an automated process may identify that the virtual machine needs additional memory and/or may initiate the request to add memory. Alternatively or in addition, the application logic 122, such as the operating system-level virtualization logic 154, may request memory with the memory allocation interface. The client logic 120 may optionally send (704) a request to create an external memory allocation and may receive (706) a response to the request to create the external memory allocation. Alternatively or in addition, the client logic may select an existing external memory allocation to use. The client logic may optionally send (704) a request to resize an existing external memory allocation and may receive a response to the request to resize the existing external memory allocation.

The client logic may proceed by allocating (708) memory from the file with the allocation interface and/or by memory-mapping (708) a portion of the file. Upon allocating memory from the file and/or memory-mapping a portion of the file, the client logic may notify (710) the hypervisor of the allocated memory and/or the memory-mapped portion. In response, the hypervisor may be configured to assign the portion of the file and/or the portion of the memory allocated from the file to the virtual machine. In one example, the client logic and/or the hypervisor may notify (712) the virtual machine of the assignment, such as by raising a memory-hot-add event with the virtual machine and/or by releasing memory with a balloon logic of the virtual machine. The balloon logic implements part of a memory reclamation technique referred to as "virtual memory ballooning". Virtual machine ballooning is a technique in which the hypervisor may retrieve unused memory from one or more guest virtual machines and share the unused memory with one or more other guest virtual machines. The balloon logic may be included in the guest operating system of the virtual machine and may interact with the hypervisor. In another example, the client logic, the container hosting logic, the jail hosting logic, and/or the zone hosting logic may notify the container, jail, and/or zone of the assignment, such as by providing a virtual address for the portion to the application logic requesting memory. Alternatively or in addition, the client logic may adjust memory allocation limits for the virtual machine, container, jail, and/or zone, such as by adjusting memory allocation limits with the memory allocation interface. Upon notifying the virtual machine, container, jail, and/or zone of the assignment, the client logic may resume normal operation, such as by starting or resuming operation of the virtual machine, container, jail, and/or zone.

The balloon logic may include logic which allocates and/or releases memory in order to decrease and/or increase the amount of memory available to the virtual machine. The memory allocated with the balloon logic may be returned to the hypervisor. For example, the balloon logic may notify (710) the hypervisor as one or more portions of memory are allocated and/or the hypervisor may consider the corresponding portions of the file to be no longer in use by the virtual machine.

Operations may complete by, for example, returning an indication that the add memory request 702 was successful to the logic that initiated the add memory request 702. Although specific steps are illustrated in FIG. 7A, additional, fewer, or different steps may be included. For example, steps (704) and (706) may not be included. In another example step 708 may not be included. In addition, the steps may be performed in an order different than illustrated.

FIG. 7B illustrates a flow diagram of an example logic of the system 100 handling a memory remove request 714 for a virtual machine. A request to remove memory 714 may be received with the client logic, starting the process. The request to remove memory 714 may be initiated by a human operator, such as through a user interface, and/or may be initiated by logic, such as the application logic and/or allocation logic. For example, an automated process may identify that the virtual machine has more memory than is necessary and/or may initiate the request to remove memory. Alternatively or in addition, the application logic, such as the logic of the container, jail, and/or zone, may free memory with the memory allocation interface. The client logic may request (716) the virtual machine to remove memory. For example, for a paravirtualized operating system, the client logic may request (716) the balloon logic of the virtual machine to allocate a corresponding amount of memory from within the virtual machine. The balloon logic may attempt to allocate one or more large contiguous areas of guest physical memory. For example, the balloon logic may perform memory compaction and/or page migration to coalesce the allocated memory into one or more large contiguous areas of guest physical memory. Alternatively or in addition, the application logic of the virtual machine, such as an operating system, may perform a memory hot-remove operation. The memory hot-remove operation may include memory compaction and/or page migration for portions of memory which are in use and are to be hot-removed. Alternatively or in addition, the client logic may adjust memory allocation limits for the virtual machine, container, jail, and/or zone, such as by adjusting memory allocation limits with the memory allocation interface. The memory allocation limits may include any limits that affect whether requests to allocate memory with the client logic are allowed, denied, and/or delayed. In one example, the memory allocation limits may indicate a maximum amount of memory to be allocated to the virtual machine, container, jail, and/or zone. In another example, the memory allocation limits may indicate a maximum rate of memory per unit time to be allocated to the virtual machine, container, jail, and/or zone. Upon removing memory from the virtual machine, container, jail, and/or zone, the client logic and/or the application logic may notify (718) the hypervisor, the container hosting logic, the jail hosting logic, and/or the zone hosting logic of the removed memory.

The client logic may proceed by deallocating and/or memory-unmapping (720) the portion of the file corresponding to the removed guest physical memory. Upon deallocating and/or memory-unmapping the portion, the client logic may optionally truncate (722) the portion of the file. Truncating (722) the portion of the file may include reclaiming corresponding portions of memory from the file data, reclaiming portions of the storage medium being used as backing for the file (such as corresponding portions of the region, corresponding portions of the memory of the memory appliance which are used for the region, and/or corresponding portions of secondary storage), zeroing the portion of the file, and/or setting one or more indicators that the portion of the file is to be zeroed upon next use. The client logic may proceed by optionally sending (724) a request to destroy the external memory allocation. Alternatively or in addition, the client logic may optionally send (724) a request to resize the external memory allocation.

Operations may complete by, for example, returning an indication that the memory remove request 714 was successful to the logic that made the memory remove request 714. Although specific steps are illustrated in FIG. 7B, additional, fewer, or different steps may be included. For example, steps (722) and (724) may not be included. In addition, the steps may be performed in an order different than illustrated.

Figure 8:
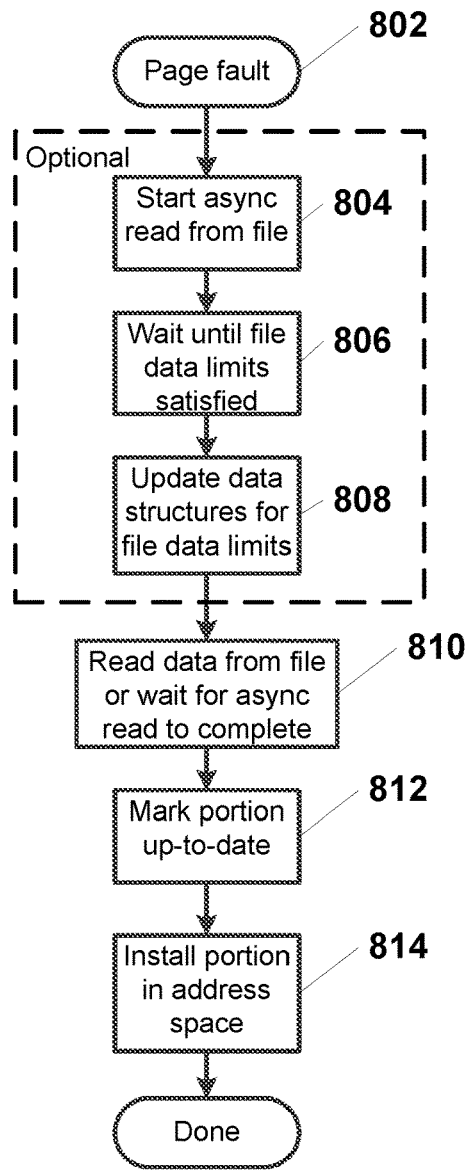
FIG. 8 illustrates a flow diagram of an example logic of a system handling a page fault for a virtual machine.

FIG. 8 illustrates a flow diagram of an example logic of the system 100 handling a page fault 802 for a virtual machine. A page fault 802 may be triggered with the client logic, starting the process. In one example, the processor may trap an operation in the context of the virtual machine which accesses a guest physical address that maps to an offset of the file which is not contained in the file data. In another example, the processor may trap an operation in the context of the container, jail, and/or zone which access a virtual address that maps to an offset of the file which is not contained in the file data. Alternatively or in addition, the process may be started by an event occurring and/or a condition being satisfied in the client logic and/or any other logic. For example, a determination may be made by the client logic, the application logic, and/or a pre-fetch logic that one or more portions of the file are likely to be used in the near future. The client logic may include an interface for other logics to trigger the start of the process. Alternatively or in addition, the client logic and/or the application logic may include the pre-fetch logic.

The pre-fetch logic may include logic that may identify one or more access patterns, page fault patterns, and/or frequently accessed portions of the file. Alternatively or in addition, the pre-fetch logic may include logic that may identify one or more portions of the file that are likely to be used in the near future. The pre-fetch logic may use any mechanism or combination of mechanisms for identifying the portions, such as fixed synchronous prefetching, adaptive synchronous prefetching, fixed asynchronous prefetching, adaptive asynchronous prefetching, perfect prefetching, and/or any other mechanism known now or later discovered. Upon identifying one or more access patterns, page fault patterns, and/or frequently accessed portions of the file and/or identifying one or more portions of the file that are likely to be used in the near future, the pre-fetch logic may trigger the page fault logic such as is illustrated in FIG. 8.

The client logic may begin by optionally starting (804) an asynchronous read from the file to a portion of memory. The portion of memory may be in the file data and/or may be associated with the offset of the file.

The client logic may continue by optionally waiting (806) until one or more file data limits have been satisfied. The file data limits may include one or more thresholds and/or resource usage limits related to the file data. The thresholds and/or resource usage limits may be specified globally, for the entire client, for one or more logics, for one or more virtual machines, for one or more containers, for one or more jails, for one or more zones, for one or more processes, for one or more operating systems, for one or more hypervisors, for one or more memory control groups, for one or more container hosting logics, for one or more jail hosting logics, for one or more zone hosting logics, for one or more files, for one or more offset ranges of one or more files, and/or for any other one or more allocation domains used by logics which is to be isolated from activity of other such domains. The thresholds may be specified in terms of total allocation of file data for a domain, total usage of CPU resources for maintaining file data for a domain, total usage of communication interface resources for a domain, and/or any other finite resource related to the file data. The thresholds and/or resource usage limits may be specified absolutely (such as a number of bytes, kilobytes, megabytes, gigabytes, pages, etc., a number of page faults per unit time, a data transfer rate, etc.) and/or may be specified relatively (such as a ratio of used memory vs total memory, available memory, free memory, reclaimable memory, free+reclaimable memory, etc.; a ratio of page faults per unit time for a specified allocation domain vs all page faults per unit time; a ratio of utilized data transfer rate vs available data transfer capacity; etc.)

In one example, the file data limits may include a file data maximum usage threshold above which no additional file data may be allocated until after other file data is reclaimed. In another example, the file data limits may include a file data usage threshold above which to trigger a reclaim process, such as the process shown in FIG. 11B. In another example, the file data limits may include a file data usage threshold below which the reclaim process may stop reclaiming file data. In another example, the file data limits may include a file data usage threshold above which to trigger an unmap process, such as the process shown in FIG.

11A. In another example, the file data limits may include a file data usage threshold below which the unmap process may stop unmapping file data. In another example, the file data limits may include a page fault per unit time threshold above which further page faults may be blocked and/or delayed. In another example, the file data limits may include a data transfer rate above which further data transfers, such as reading data from a memory appliance, may be blocked, delayed, and/or throttled.

For example, the client logic may wait until the amount of file data in use for the virtual machine, container, jail, and/or zone is below a specified maximum size. While waiting, the client logic may trigger a memory unmap and/or reclaim process, such as the process illustrated in FIGS. 11A, 11B, and/or 11C. In another example, the client logic may wait until the rate of handling page faults for a group of virtual machines, containers, jails, and/or zones that includes the virtual machine, container, jail, and/or zone is below a specified maximum rate. In another example, the client logic may wait until the data transfer rate for the file for the past time slice (such as for the past 100 ms or any other period of time) is below a specified maximum ratio of available data transfer capacity, such as a ratio of data transfer rate for the file versus the link speed of the communication interface. The client logic may optionally allow a page fault to proceed without waiting until the file data limits have been satisfied, such as if sufficient overall resources are available in the client and/or if there is low demand for resources by other domains. Alternatively or in addition, the client logic may optionally fail and/or abort a page fault operation without waiting until the file data limits have been satisfied. For example, the page fault and/or the faulting logic may indicate that the page fault is for non-essential data, such as for a pre-fetch or read-ahead operation, and/or may indicate that the preferred approach is not to wait for the file data limits to be satisfied.

Upon proceeding, the client logic may optionally update (808) data structures for file data limits. For example, the client logic may update statistics of total file data usage for each domain, statistics of total usage of CPU resources for maintaining file data for each domain, statistics of data transfer rates, and/or statistics of any other finite resource related to the file data.

The client logic may continue by reading (810) data from the file to the portion of memory and/or by waiting until the previously started asynchronous read to the portion is complete. Upon completing reading data from the file to the portion, the client logic may mark (812) the portion up-to-date. Upon marking the portion up to date, the client logic may install (814) the portion into the address space of the faulting logic. For example, the client logic may install a page table entry into the virtual address space associated with the virtual machine, container, jail, and/or zone and/or may update address translation tables with the hypervisor for the virtual machine.

Operations may complete by, for example, returning an indication that the page fault was handled to the logic that triggered the page fault. Although specific steps are illustrated in FIG. 8, additional, fewer, or different steps may be included. For example, steps (804), (806), and (808) may not be included. In addition, the steps may be performed in an order different than illustrated.

Figure 9:
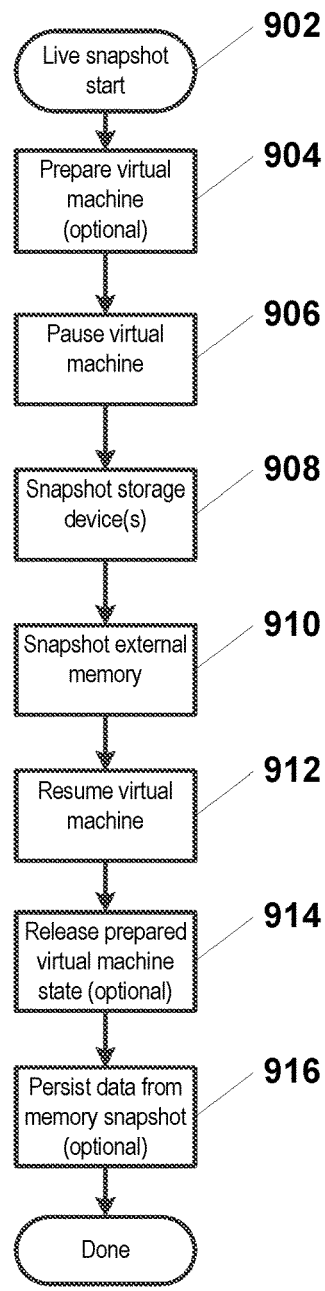
FIG. 9 illustrates a flow diagram of an example logic of a system performing a live snapshot of a running virtual machine using external memory.

FIG. 9 illustrates a flow diagram of an example logic of the system 100 performing a live snapshot or making a copy of a running virtual machine using external memory. The live snapshot may be considered to be a virtual copy of the running virtual machine at the time the live snapshot was triggered and/or at an effective time of the live snapshot. A request to perform a live snapshot may be received (902) with the client logic, starting the process. The client logic may optionally prepare (904) the virtual machine for the live snapshot. For example, the client logic may request the logic of the virtual machine to flush dirty filesystem data to their respective backing store and/or to freeze filesystems. In one example, the client logic may freeze the virtual filesystem for the file. Freezing a filesystem, such as the virtual filesystem for the file, may cause the logic for the filesystem to block and/or pause operation of any logic which attempts to change the data of the filesystem and/or of the file. Alternatively or in addition, the client logic may flush dirty data within the file data for the virtual machine to the file. The client logic may proceed by pausing (906) operation of the virtual machine. Alternatively or in addition, the virtual machine may be considered paused at the time the virtual filesystem is frozen. The time at which the virtual machine is paused may be considered the effective time of the live snapshot.

After pausing operation of the virtual machine, the client logic may trigger (908) snapshots of zero or more secondary storage entities (such as files, filesystems, volumes, sub-volumes, and/or devices) being used with the virtual machine. For example, the client logic may trigger a point-in-time snapshot with a SAN and/or NAS device and/or volume being used as secondary storage for the virtual machine. In another example, the client logic may trigger a point-in-time snapshot with a filesystem being used as secondary storage for the virtual machine. In another example, the client logic may trigger a point-in-time snapshot with a partition and/or logical volume (such as with the Linux Logical Volume Manager or any other device-mapper system) being used as secondary storage for the virtual machine. In some examples, the operation of the virtual machine may be paused before, after, and/or coincident with triggering snapshots of zero or more secondary storage entities.

Also after pausing operation of the virtual machine, the client logic may trigger (910) a snapshot and/or a copy of the memory of the virtual machine. Performing a snapshot of the memory of the virtual machine may include flushing dirty data within the file data for the virtual machine to the file. Alternatively or in addition, performing the snapshot may include copying the contents of the memory of the virtual machine to secondary memory and/or the backing store of the client. Alternatively or in addition, performing the snapshot may include triggering a snapshot of the file, such as with a copy-on-write-capable filesystem, partitioning system, storage system, and/or any other system capable of maintaining a copy-on-write relationship between files. Alternatively or in addition, performing the snapshot may include triggering a snapshot with the memory appliance(s) of one or more regions and/or external memory allocations, such as described in U.S. non-provisional patent application Ser. No. 14/854,657, filed Sep. 15, 2015, entitled "PAGING OF EXTERNAL MEMORY", which is hereby incorporated by reference. Alternatively or in addition, performing the snapshot may include copying the contents of one or more regions and/or external memory allocations to one or more other regions and/or external memory allocations. Alternatively or in addition, performing the snapshot may include copying the contents of one or more regions and/or external memory allocations to the backing store(s) of the corresponding memory appliance(s).

Alternatively or in addition, performing the snapshot of the memory of the virtual machine may include creating a snapshot of one or more portions of the file that are mapped to the virtual machine, such as is described for forking processes in U.S. Provisional Patent Application 62/139,310 entitled "FORK-SAFE MEMORY ALLOCATION FROM MEMORY-MAPPED FILES WITH ANONYMOUS MEMORY BEHAVIOR" and filed Mar. 27, 2015, which is hereby incorporated by reference. Creating the snapshot may include forking the process for the virtual machine. As such, forking the process of the virtual machine may create a point-in-time snapshot of the memory of the process, which may include the memory of the virtual machine. Alternatively, the snapshot may be created without forking the process, using the same techniques. For example, the client logic may create a copy-on-write mapping between a first portion of the file mapped to the virtual machine and a second portion of the same or another file. As such, attempts to read the second portion would return the data of the virtual machine at the time the copy-on-write mapping is established and/or attempts to write to the first portion may cause data to be copied from the first portion to the second portion prior to writing to the first portion.

Upon completion of performing the snapshot of the memory of the virtual machine, the client logic may, for example, resume (912) operation of the virtual machine. Upon resuming operation of the virtual machine, the client logic may optionally release (914) any previously prepared virtual machine state. For example, if any filesystems had been frozen, those filesystems may be un-frozen.

At any time following completion of performing the snapshot of the memory of the virtual machine, the client logic may optionally persist (916) data from the snapshot and/or the copy of the memory of the virtual machine. For example, the client logic may persist and/or copy the data to an alternate location and/or media, such as to secondary memory, the backing store of the client, the backing store of the memory appliance, and/or any other one or more locations and/or media.

Upon completion of resuming operation of the virtual machine and/or any of the described optional activities, the client logic may resume normal operation.

An analogous flow may be used for performing a live snapshot of an operating system-level virtualization instance, such as a container, jail, and/or zone. For example, creating the snapshot of the memory of the operating system-level virtualization instance may include forking the one or more processes for the operating system-level virtualization instance. As such, forking the processes of the operating system-level virtualization instance may create a point-in-time snapshot of the memory of each process, and therefore of the operating system-level virtualization instance. Alternatively or in addition, the client logic may freeze the virtual filesystem in order to effectively pause one or more processes of the operating system-level virtualization instance simultaneously. All other steps described for FIG. 9 may be the same for performing a live snapshot of the operating system-level virtualization instance as for performing a live snapshot of a virtual machine.

Operations may complete by, for example, returning an indication that the live snapshot was successfully performed to the logic that triggered and/or sent the request to perform the live snapshot. Although specific steps are illustrated in FIG. 9, additional, fewer, or different steps may be included. For example, steps (904) and (914) may not be included. In addition, the steps may be performed in an order different than illustrated.

Figure 10:
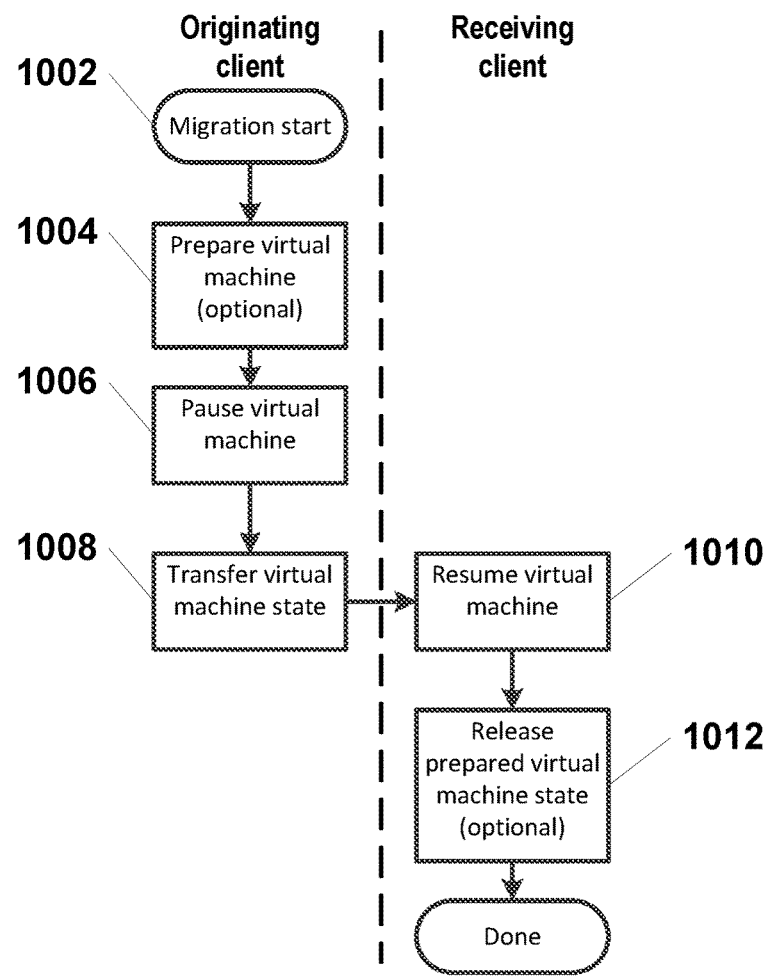
FIG. 10 illustrates a flow diagram of an example logic of a system performing a migration of a virtual machine.

FIG. 10 illustrates a flow diagram of an example logic of the system 100 performing a migration of a virtual machine.

The migration of a virtual machine may include changing the physical client with which the virtual machine is operating from a first client (a sending client) to a second client (a receiving client). Alternatively or in addition, the migration may include transferring and/or copying some or all of the data and/or logic of the virtual machine from the sending client to the receiving client.

A request to perform a migration of a virtual machine may be received (1002) by the client logic, starting the process of performing the migration. The client logic may optionally prepare (1004) the virtual machine for the migration. For example, the client logic may request the logic of the virtual machine to flush dirty filesystem data to their respective backing store and/or to freeze filesystems. Alternatively or in addition, preparing the virtual machine for the migration may include copying all of or a portion of the data of the memory of the virtual machine. For example, the client logic may flush dirty data within the file data for the virtual machine to the file. Alternatively or in addition, the client logic may copy one or more portions of the file data to the memory of the receiving client, such as by transferring the data via the communication interface. Transferring the data via the communication interface may include using a network protocol such as TCP/IP and/or writing to the memory of the receiving client via client-side memory access.

Alternatively or in addition, the client logic may cause data to be copied from a first file to a second file, from a first region to a second region, and/or from a first external memory allocation to a second external memory allocation. The first and second file, region, and/or external memory allocation may be included in the same or different devices, such as one or more clients, one or more memory appliances, one or more secondary storage devices, and/or any other devices. In some examples, once the copying is initiated by the client logic, the client logic may not be involved in copying the data from the first file to the second file, from the first region to the second region and/or from the first external memory allocation to the second external memory allocation.

Copying all of or a portion of the data of the memory of the virtual machine may be performed one or more times. For example, the client logic may iteratively flush and/or copy the data and/or may track which portions have been re-dirtied while flushing and/or copying. The client logic may iterate until some end point is reached, such as if none of the data is dirty after an iteration, if more data is dirty after performing an iteration than before starting the iteration, after a maximum number of iterations has been performed, etc. After optionally preparing the virtual machine for the migration, the client logic may proceed by pausing (1006) operation of the virtual machine.

After pausing operation of the virtual machine, the client logic may transfer (1008) the state of the virtual machine to the receiving client. Transferring the state of the virtual machine may include continuing to copy all of or a portion of the data of the memory of the virtual machine. For example, if the client logic stopped iteratively copying all of or a portion of the data of the memory of the virtual machine while some of the data was still dirty and/or if more data became dirty before pausing the virtual machine, the client logic may perform one or more additional iterations.

The state of the virtual machine may include the contents of the CPU registers for the virtual machine, the memory mapped to the virtual machine, the contents of and/or references to secondary storage used with the virtual machine, and/or any other data related to the virtual machine. Alternatively, instead of the state of the virtual machine including all of the memory mapped to the virtual machine, the state may include the dirty data within the file data for the file. The client logic may transfer the dirty data to the receiving client and/or it may flush the dirty data to the file. The state of the virtual machine may be transferred to the receiving client via the communication interface, such as by transferring using a network protocol such as TCP/IP and/or by writing to the memory of the receiving client via client-side memory access.

After transferring the state of the virtual machine to the receiving client, the client logic of the receiving client may resume (1010) operation of the virtual machine. Upon resuming operation of the virtual machine, the client logic may optionally release (1012) any previously-prepared virtual machine state. For example, if any filesystems had been frozen, those filesystems may be un-frozen.

Upon completion of resuming operation of the virtual machine and/or any of the described optional activities, the client logic may resume normal operation.

The request to perform a migration of a virtual machine may be initiated by a human operator, such as through a user interface, and/or may be initiated by another logic, such as the application logic and/or allocation logic. For example, a migration logic may identify that the virtual machine is to be migrated and/or may initiate the request to perform a migration of a virtual machine. The migration logic may be included in the client logic, the application logic, the allocation logic, and/or any other logic.

The migration logic may identify that the virtual machine is to be migrated based upon the past and/or present activity of the virtual machine, resources in use by the virtual machine, indications provided by the virtual machine, and/or any other characteristic and/or behavior of the virtual machine. Alternatively or in addition, the migration logic may identify that the virtual machine is to be migrated based upon the past and/or present activity of other application logics, resources in use by other application logics, indications provided by other application logics, and/or any other characteristics and/or behavior of other application logics. In one example, the migration logic may identify a virtual machine is to be migrated based upon unusually high or low CPU usage by the virtual machine. In this example, the migration logic may identify that a virtual machine with high CPU usage is to be migrated to a receiving client with additional CPU's and/or under-utilized CPU's. In another example, the migration logic may identify a virtual machine is to be migrated based upon unusually high or low amounts of file data usage and/or page fault activity. In this example, the migration logic may identify that a virtual machine with high amounts of file data usage is to be migrated to a receiving client with more memory included in the receiving client and/or to a receiving client with less of the memory of the receiving client in use by other application logics. Alternatively or in addition, the migration logic and/or the client logic may identify that a virtual machine with high amounts of page fault activity may benefit from increased file data limits and/or may identify that the virtual machine is to be migrated to a receiving client with more memory included in the receiving client and/or to a receiving client with less of the memory of the receiving client in use by other application logics. In another example, the migration logic may identify a virtual machine is to be migrated based upon an indication from the virtual machine that the virtual machine may require a larger working set. In this example, the migration logic may identify that the virtual machine (from which it received the indication that the virtual machine may require a larger working set) is to be migrated to a receiving client with more memory included in the receiving client and/or to a receiving client with less of the memory of the receiving client in use by other application logics.

An analogous flow may be used for migrating an operating system-level virtualization instance, such as a container, jail, and/or zone. For example, the client logic may freeze the virtual filesystem in order to effectively pause one or more processes of the operating system-level virtualization instance simultaneously. All other steps described for FIG. 10 may be the same for migrating the operating system-level virtualization instance as for migrating the virtual machine.

Although specific steps are illustrated in FIG. 10, additional, fewer, or different steps may be included. For example, steps (1004) and (1012) may not be included. In addition, the steps may be performed in an order different than illustrated.

The client logic may rely upon other logic, such as the operating system, hypervisor, container hosting logic, jail hosting logic, and/or zone hosting logic, to determine portions of the file data to invalidate and/or reclaim for other purposes, such as to handle page faults for other portions and/or other files. Alternatively or in addition, the client logic may select portions to invalidate and/or reclaim and/or may cause the portions to be invalidated and/or reclaimed. In one example, the operating system may determine that portions of the file data are to be invalidated and/or reclaimed upon handling a request for memory from the client logic and/or any other logic of the system. In another example, the client logic may determine that portions of the file data are to be invalidated and/or reclaimed upon handling a page fault and/or I/O fault, such as when needing to allocate memory for the faulting portion.

Causing the portions of the file data to be invalidated and/or reclaimed may include unmapping one or more page table entries for the portions, shooting-down one or more entries in one or more translation lookaside buffers (TLBs) for the page table entries, flushing the translation lookaside buffers (TLBs), and/or freeing the memory associated with the portions.

Shooting-down an entry in the TLB typically refers to an operation that clears the specified entry. In contrast, flushing the TLBs typically refers to an operation that clears a set of entries. However, shooting-down an entry in the TLB and flushing the TLB are used interchangeably herein. A Translation lookaside buffer (TLB) is a memory cache that is used to reduce the time a processor (such as the processor 112 of the client 102) may need to access a memory location. The TLB may be part of a processor's memory-management unit (MMU). The TLB may cache recent translations of virtual memory addresses to physical memory addresses for the processor.

Causing the portions of the file data to be invalidated and/or reclaimed may be performed upon multiple portions in a batched invalidation and/or reclaim operation. For example, the client logic may unmap one or more page table entries for multiple portions and then flush the affected translation lookaside buffers, such as the translation lookaside buffers for any processors that are using the address space containing the page table entries at the time the page table entries are reclaimed. Alternatively or in addition, the client logic may not flush translation lookaside buffers for processors that are no longer using the address space.

Figure 11A:
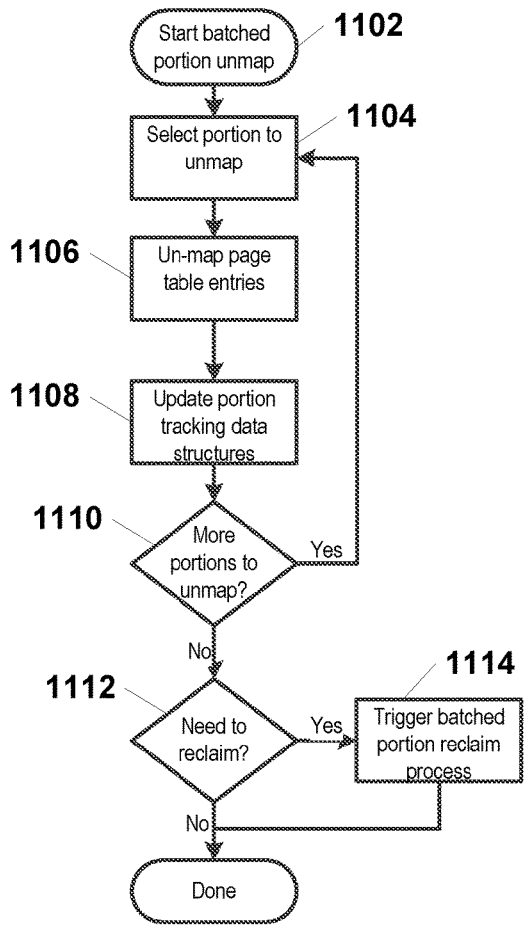
FIG. 11A illustrates a flow diagram of example logic of a system performing batched portion unmap.

FIG. 11A illustrates a flow diagram of example logic of the system 100 performing a batched portion unmap 1102. The client logic may begin by selecting (1104) a portion to unmap. The portion may be selected based on the state of portion-tracking data structures. For example, the portion may be the next portion to unmap in a list of portions ordered by time of last use.

The portion-tracking data structures may be included in the data structures for file data limits. Accordingly, the list of portions may include portions in use by one or more allocation domains and/or may include portions in use by all allocation domains of the client. Alternatively or in addition, there may be multiple lists of portions. The portion-tracking data structures and/or list of portions used may be related to file data limits used and/or the reason for triggering the logic described in FIG. 11A. For example, if the batched portion unmap 1102 was triggered due to a virtual machine using more file data than a threshold specified by the file data limits for the virtual machine, then portion-tracking data structures and/or a list of portions corresponding to the virtual machine may be used. The list of portions corresponding to the virtual machine may reference portions in use by the virtual machine and/or may be ordered by time of last use. A portion may be referenced by one or more lists of portions. For example, a portion in use by a virtual machine may be referenced by a list of portions for the virtual machine, a list of portions for the group of virtual machines including the virtual machine, and/or a list of portions for all allocation domains of the client.

Upon selecting the portion to unmap, the client logic may unmap (1106) page table entries for the portion. Unmapping page tables for the portion may include clearing page table entries, shooting-down one or more entries with one or more translation lookaside buffers (TLB's), flushing one or more translation lookaside buffers (TLB's) for processors using the address space, and/or updating data structures associated with the portion. Alternatively or in addition, unmapping page tables for the portion may not include shooting down entries and/or flushing one or more TLB's at this time. In lieu of shooting down entries and/or flushing one or more TLB's, the client logic may update (1108) the portion-tracking data structures, such as page-tracking data structures and/or any other type of data structures associated with the portion. In one example, the client logic may update one or more flags included in the portion-tracking data structures indicating that one or more TLB's have not been flushed for the portion. In another example, the client logic may update one or more generation counters included in the data structures associated with the portion, indicating the logical time at which a page table entry was last cleared for the portion and/or for a processor. A generational counter may be a value that may be incremented with each event, which may be used to identify the order in which events have occurred. In another example, updating (1108) portion-tracking data structures may include updating a bitmask of processors needing a TLB flush to indicate that a TLB flush is to be performed for the processors using the address space. Unmapping page tables for the portion may include indicating with the portion-tracking data structures (such as with one or more flags and/or generation counters) that a dirty page table entry was cleared, if while clearing page table entries, one or more of the cleared page table entries for the portion had been marked dirty by the processor. An indication in the portion-tracking data structure that a dirty page table entry was cleared or unmapped may indicate that the page corresponding to the dirty page table entry is to be marked dirty in the portion-tracking data structure after the corresponding TLB is flushed or shot down. After a page is marked dirty in the portion-tracking data structure, the page may be written back to the file backing the file-backed memory. Writing the page back to the file may be handled in a process or thread different from the process or thread that unmaps the page table entries for the portion and/or that flushes or shoots down the corresponding TLB.

Unmapping (1106) page tables for the portion may include updating page tables within the virtual machine, container, jail, and/or zone and/or may include notifying the hypervisor, the operating system, and/or the virtual machine of the unmapped portion. For example, the client logic may notify the hypervisor, the operating system, and/or the virtual machine using an mmu-notifier interface. The hypervisor, the operating system, and/or the virtual machine may react to the notification by unmapping corresponding page tables for the portion, such as by clearing page table entries, shooting-down one or more entries with one or more translation lookaside buffers (TLB's), flushing one or more translation lookaside buffers (TLB's) for processors using the address space, and/or updating data structures associated with the portion.

Upon unmapping (1106) the page table entries, the client logic may update (1108) the portion-tracking data structures. For example, the portion may be moved to a list of portions that have been unmapped but not reclaimed.

Upon updating (1108) the portion-tracking data structures, the client logic may check (1110) if more portions are to be unmapped. For example, the client logic may check if the portion-tracking data structures indicate that too many portions and/or pages are in use for the virtual machine, container jail, and/or zone and are not yet unmapped. If the client logic determines that more portions are to be unmapped, the process may restart by selecting (1104) the next portion to unmap.

Alternatively, if the client logic determines that no more portions are to be unmapped, the client logic may check (1112) if portions are to be reclaimed. For example, the client logic may check if the portion-tracking data structures indicate that too many portions and/or pages are in use for the virtual machine, container jail, and/or zone. Too many portions and/or pages may be in use for the virtual machine if the number of portions and/or pages in use exceeds a threshold number. If the client logic determines that portions are not to be reclaimed, the batched portion unmap may be complete, and the client logic may resume normal operation. Alternatively, if the client logic determines that portions are to be reclaimed, the client logic may trigger (1114) a batched portion invalidation and/or reclaim process, such as the process illustrated in FIG. 11B, and resume normal operation.

Figure 11B:
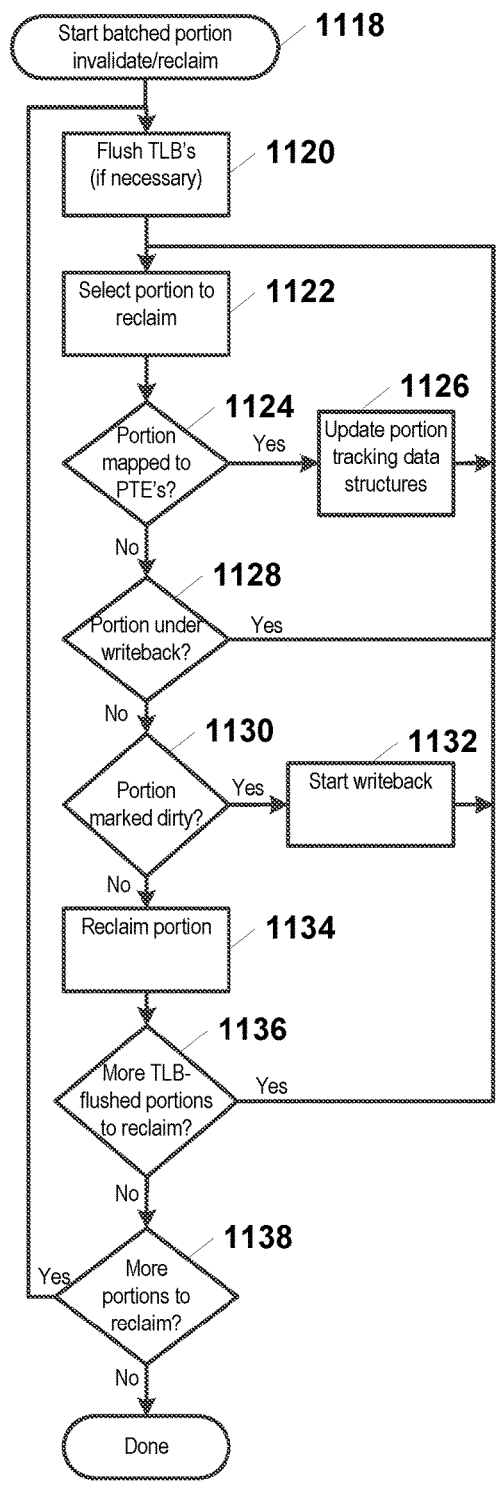
FIG. 11B illustrates a flow diagram of example logic of a system performing batched portion invalidation and/or reclaim.

FIG. 11B illustrates a flow diagram of example logic of a system performing a batched portion invalidation and/or reclaim 1118. The client logic may begin by flushing (1120) one or more TLB's, if necessary. For example, if one or more TLB entries were not shot down and/or one or more TLB's were not flushed when one or more page table entries were unmapped, then one or more TLB flushes may be necessary prior to reclaiming the portions associated with the page table entries. The region access logic may check the portion-tracking data structures and/or data structures associated with the portion to determine whether or not one or more TLB's need to be flushed and/or may flush the TLB's. For example, one or more TLB's may need to be flushed if the bitmask of processors needing a TLB flush indicates that the TLB's need to be flushed. Alternatively or in addition, the client logic may flush TLB's without checking whether it is necessary to do so.

Flushing the TLB's may include updating the portion-tracking data structures and/or data structures associated with the portion to indicate that one or more TLB flushes have been performed and/or that one or more portions do not need the TLB flushed before they may be reclaimed. In one example, updating portion-tracking data structures may include updating a bitmask of processors needing a TLB flush to indicate that a TLB flush is no longer needed for the flushed TLB's. In one example, updating portion-tracking data structures may include updating one or more generation counters, indicating the logical time at which the TLB was flushed. In another example, updating portion-tracking data structures may include marking portions as dirty for which the data structures associated with the portions indicate that a dirty page table entry was cleared for the portion. The portions may be marked dirty after the one or more TLB flushes have been performed. For portions marked dirty, the client logic may clear the indication in the data structures associated with the portion and/or may optionally start writeback of the portion.

After flushing (1120) TLB's (if necessary), the client logic may select (1122) a portion to reclaim. The portion may be selected based on the state of portion-tracking data structures. For example, the portion may be the next portion to reclaim in a list of portions that have been unmapped but not reclaimed. The list of portions that have been unmapped but not reclaimed may be associated with the list of portions ordered by time of last use. For example, both lists may correspond to the same allocation domain.

After selecting (1122) a portion to reclaim, the client logic may check (1124) if the portion is mapped to any page table entries. If so, then the client logic may update (1126) portion-tracking data structures and/or move on to select (1122) a different portion to reclaim. Updating (1126) the portion-tracking data structures may include moving the portion to the list of portions ordered by time of last use.

If the portion is not mapped to any page table entries, then the client logic may check (1128) if the portion is under writeback. The portion may be under writeback if the contents of the portion are currently being written to the file. If the portion is under writeback, then the client logic may move on to select (1122) a different portion to reclaim.

Alternatively, if the portion is not under writeback, then the client logic may check (1130) if the portion is dirty. The portion may be dirty if the portion contains data which has been written to, but which has not yet been written back to the file and/or the backing store. If the portion is dirty, the client logic may start (1132) writeback of the portion and may move on to select (1122) a different portion to reclaim.

If the portion is not dirty, then the client logic may reclaim (1134) the portion. Reclaiming the portion may include triggering operations similar to as described for FIG. 11C. Alternatively or in addition, reclaiming (1134) the portion may include freeing the memory associated with the portion.

After reclaiming (1134) the portion, the client logic may check (1136) whether more portions are to be reclaimed from those that have had the TLB flushed. For example, the client logic may check if the portion-tracking data structures indicate that too many portions and/or pages are in use for the virtual machine, container, jail, and/or zone and/or may check if a list of portions that have had the TLB flushed is not empty. If the client logic determines that more portions are to be reclaimed from those that have had the TLB flushed, the client logic may move on to select (1122) the next portion to reclaim.

If there are no portions to reclaim that have had the TLB flushed, then the client logic may check (1138) whether more portions are to be reclaimed. For example, the client logic may check if the portion-tracking data structures indicate that too many portions and/or pages are in use for the virtual machine, container jail, and/or zone and/or may check if the list of portions that have been unmapped but not reclaimed is empty. If the client logic determines that more portions are to be reclaimed, the process may restart by flushing (1120) TLB's, if necessary. If the client logic determines that no more portions are to be reclaimed, the client logic may resume normal operation.

Figure 11C:
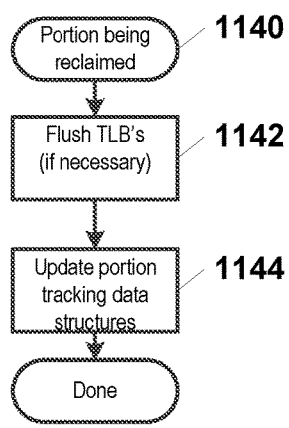
FIG. 11C illustrates a flow diagram of example logic of a system reacting to a pending reclaim operation.

FIG. 11C illustrates a flow diagram of example logic of a system reacting to a pending reclaim operation (1140). The client logic may react to the pending reclaim operation by flushing (1142) one or more TLB's if necessary. Upon flushing one or more TLB's (if necessary), the client logic may update (1144) the portion-tracking data structures. For example, the client logic may remove the portion from the portion-tracking data structures and/or may update information reflecting the number of portions and/or pages that are in use for the region. In another example, updating the portion-tracking data structures may include marking the portion as dirty if the data structures associated with the portion indicate that a dirty page table entry was cleared for the portion. Upon marking the portion dirty, the client logic may clear the indication in the data structures associated with the portion. If the portion is marked dirty, the client logic may optionally start writeback of the portion. Upon updating the portion-tracking data structures, reacting to the pending reclaim operation is complete, and the client logic may resume normal operation.

In one aspect, a system for virtualization using memory-mappings of external primary memory may be provided. The system may add external primary memory to a virtual machine. The system may remove external primary memory from a virtual machine.

External primary memory may be assigned by the allocation logic. The memory mapping may be provided via memory-mapped files. The memory mapping may be provided via a memory paging interface. The external primary memory may be accessed via client-side memory access. The system may migrate a virtual machine from a first client to a second client by copying data for the virtual machine's memory from a first region to a second region.

The first region and second region may be in one memory appliance so that the data may be transferred between the regions without being transferred to or from the first client and/or the second client. Alternatively, the first region and the second region may be in a first memory appliance and second memory appliance, respectively. The data may be transferred between the first and second memory appliances without being transferred to the first client or the second client. The data may be transferred using client side memory access.

In another aspect, the system may perform a live snapshot based on external primary memory used by a virtual machine. The system may perform the live snapshot by making a copy or snapshot of the file, filesystem, and/or subvolume to which the external primary memory is mapped. A subvolume may be a logical portion of a filesystem that may be snapshotted independently of other logical portions of the filesystem. For example, in a filesystem organized into a tree of subdirectories, a subvolume may correspond to a portion and/or subtree of the tree of the filesystem. Alternatively or in addition, the live snapshot may be performed by forking the process that executes the virtual machine. The newly forked process may access the memory—either external primary memory or anonymous memory—using a copy-on-write or other algorithm that provides the parent and child process two different views of the memory. The view of the memory to the parent and child at the time of the fork is the same, but the views differ after data is written to the memory by either the parent or child process.

Alternatively or in addition, the system may perform the live snapshot by making a snapshot or copy of the memory appliance (or a portion of memory within the memory appliance) that provides the external primary memory to the client. Alternatively or in addition, the system may perform the live snapshot by copying a region of the memory appliance to an alternate location (another region, backing store, etc).

In yet another aspect, a method and/or a system may be provided for limiting local primary memory usage by virtual machines which use file-backed memory. In file-backed memory, the memory may be backed by external primary memory, secondary memory, or any other type of storage. In some examples, the file is a swap file, swap partition, and/or swap device. In some examples, a method and/or a system may be provided for limiting local primary memory usage by file-backed memory implementations regardless of whether virtual machines are present or in operation.

For example, the local primary memory may include a page cache. The system or method may limit the usage of the page cache. One or more worker threads may be created for each set of limits that perform batch portion unmap and batch reclaim for each set of limits.

Memory pages of the file-backed memory may have corresponding page table entries. The page table entries may have been marked dirty indicating the memory pages had been written to but had not yet been written to the file backing the file-backed memory. If page table entries that are marked dirty in the page table entries are unmapped from guest physical addresses and/or virtual addresses, then a portion-tracking data structure may be updated to indicate that the portion had dirty page table entries unmapped. In some examples, memory pages marked as having had dirty page table entries unmapped may be marked dirty in the portion-tracking data structure only after subsequently flushing one or more TLB's associated with the memory pages. Flushing the one or more TLB's associated with the memory pages may be performed separately from unmapping the page table entries and/or may be performed for one or more TLB's associated with multiple memory pages. After the memory pages are marked dirty in the portion-tracking data structure, the memory pages may be written back to the file supporting the file-backed memory.

The limits may be specified per process. The limits may be specified per file. For example, the limits may be specified per file that is memory mapped. The limits may be specified per memory control group. The limits may be specified per virtual machine or group of virtual machines. Alternatively or in addition, the limits may be entirely independent of virtual machines. For example, the system or method may limit local primary memory usage, such as page cache usage, in any system which use file-backed memory, even a system without any virtual machines.

Memory pages of the file-backed memory may be unmapped from guest physical addresses and/or virtual addresses separately from reclaiming the pages. The memory pages may be unmapped from guest physical addresses and/or virtual addresses without immediately invalidating TLB entries.

Wherever the term "file" is used herein, the phrase "programmatic interface" may alternatively be substituted for the term "file" describing a broader construct than the traditional file. The programmatic interface may be any interface for reading and/or writing data including, for example, an interface for reading and/or writing data in logical data blocks.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

Although specific steps of methods are illustrated in flow diagrams, additional, fewer, or different steps may be included in the illustrated methods. In addition, the steps may be performed in an order different than illustrated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. An apparatus comprising: a processor configured to execute a virtualization instance, the processor further configured to:
    allocate a region of an external primary memory, the region of the external primary memory accessible on a memory appliance by the apparatus over a network, wherein the external primary memory is memory that is external to the apparatus but is primary memory to the apparatus;
    allocate at the apparatus a subset of the previously allocated region of the external primary memory to be a slab of the external primary memory in response to a request to allocate the slab, the request comprising an invocation of a programmatic method of a memory allocation interface;
    map, at the apparatus, at least the slab of the external primary memory to a virtual address space; and
    access the external primary memory on the memory appliance over the network with client-side memory access in which a communication interface of the memory appliance is configured to access the external primary memory, wherein the external primary memory is accessible by the virtualization instance through the virtual address space.

2. The apparatus of claim 1, wherein the processor is configured to add external primary memory to the virtualization instance during execution of the virtualization instance.

3. The apparatus of claim 1, wherein the processor is configured to remove a subset of the external primary memory from the virtualization instance.

4. The apparatus of claim 1, wherein the processor is further configured to perform a snapshot of primary memory of the virtualization instance, the primary memory of the virtualization instance including the external primary memory.

5. The apparatus of claim 4, wherein performance of the snapshot of the primary memory of the virtualization instance includes initiation of a copy of at least one of a file, a filesystem, or a subvolume to which the external primary memory is mapped.

6. The apparatus of claim 4, wherein the virtualization instance executes in a first process, and wherein performance of the snapshot of the primary memory of virtualization instance includes creation of a forked process of the first process, and further includes maintenance of a first view of the primary memory of the virtualization instance for the first process and a second view of the primary memory of the virtualization instance for the forked process, wherein the forked process has access to the snapshot of the primary memory of the virtualization instance through the second view of the primary memory.

7. The apparatus of claim 4, wherein performance of the snapshot of the primary memory of the virtualization instance includes initiation of a snapshot of memory on a memory appliance that backs the external primary memory.

8. The apparatus of claim 4, wherein performance of the snapshot of the primary memory of the virtualization instance includes creation of a copy of contents of a region and/or an allocation of the external primary memory that resides on a memory appliance.

9. The apparatus of claim 1, wherein the programmatic method of the memory allocation interface includes malloc( ).

10. The apparatus of claim 1, wherein the programmatic method of the memory allocation interface includes mmap( ).

11. The apparatus of claim 1, wherein the at least the slab includes the region of the external primary memory.

12. The apparatus of claim 1, wherein the invocation of the memory allocation interface is from the virtualization instance.

13. A method comprising:
    allocating a first region of an external primary memory for a virtualization instance, the first region of the external primary memory accessible on a memory appliance by a first client over a network, wherein the virtualization instance executes on the first client, and wherein the external primary memory on the memory appliance is accessible over the network with client-side memory access in which a communication interface of the memory appliance is configured to access the external primary memory;
    allocating at the first client a subset of the previously allocated first region of the external primary memory to be a slab of the external primary memory in response to a request to allocate the slab, the request comprising an invocation of a programmatic method of a memory allocation interface;
    map, at the first client, at least the slab of the external primary memory to a virtual address space, wherein the external primary memory is accessible by the virtualization instance through the virtual address space; and
    migrating the virtualization instance from the first client to a second client by:
    copying data stored in the first region of the external primary memory to a second region, and wherein the first region and the second region are included in the memory appliance; and
    resuming operation of the virtualization instance on the second client, wherein the second region is external primary memory for the virtualization instance executing on the second client, and wherein the second region of the external primary memory and the data copied thereto is accessible by the virtualization instance executing on the second client with client-side memory access.

14. The method of claim 13, wherein the memory appliance is a single memory appliance and the first region and the second region are included in the single memory appliance, and wherein the data is copied from the first region to the second region without being transferred to the first client or the second client.

15. The method of claim 13, wherein the memory appliance comprises a first memory appliance and a second memory appliance, wherein the first region is in the first memory appliance and the second region is in the second memory appliance, and the data is copied from the first region to the second region without being transferred to the first client or the second client.

16. The method of claim 15, wherein the data is copied from the first region to the second region using client side memory access.

17. The method of claim 13, wherein the virtualization instance includes a virtual machine, a container, a jail, or a zone.

18. A method for limiting local primary memory usage, the method comprising:
    backing a plurality of memory portions by a file, a subset of the memory portions included in local primary memory, wherein the memory portions are mapped to an address space of a virtualization instance;
    including, in the local primary memory, a plurality of portion-tracking data structures that correspond to the memory portions;
    unmapping a page table entry for a selected memory portion from the address space of the virtualization instance;
    updating a portion-tracking data structure corresponding to the selected memory portion to indicate that the page table entry for the selected memory portion was dirty when unmapped;
    flushing or shooting down a translation lookaside buffer (TLB) for the page table entry;
    marking, after the flushing or the shooting down the translation lookaside buffer, the selected memory portion corresponding to the page table entry dirty based on the portion-tracking data structure indicating that the page table entry for the selected memory portion was dirty when unmapped; and
    writing the selected memory portion to the file based on the selected memory portion being marked dirty.

19. A method for limiting local primary memory usage, the method comprising:
    backing a plurality of memory portions by a file, a subset of the memory portions included in local primary memory;
    including, in the local primary memory, a plurality of portion-tracking data structures that correspond to the memory portions;
    unmapping a page table entry for a selected memory portion from a virtual address space;
    updating a portion-tracking data structure corresponding to the selected memory portion to indicate that the page table entry for the selected memory portion was dirty when unmapped;
    flushing or shooting down a translation lookaside buffer (TLB) for the page table entry;
    marking, after the flushing or the shooting down the translation lookaside buffer, the selected memory portion corresponding to the page table entry dirty based on the portion-tracking data structure indicating that the page table entry for the selected memory portion was dirty when unmapped; and
    writing the selected memory portion to the file based on the selected memory portion being marked dirty.

20. The method of claim 19, wherein the file is memory mapped external primary memory.

21. The method of claim 19 further comprising allocating the subset of the memory portions in response to one or more invocations of a programmatic method of a memory allocation interface.

22. The method of claim 19, wherein content of the file is accessed via client side memory access.

23. A method comprising:
    allocating an external primary memory for a client, wherein the external primary memory is external to the client but is primary memory to the client, wherein the external primary memory is accessible over a communication interface of the client with client-side memory access in which a communication interface of a memory appliance on which the external primary memory resides is configured to access the external primary memory, and wherein a slab of the external primary memory is allocable at the client, in response to a request at the client to allocate the slab, by the client selecting a subset of the external primary memory previously allocated and mapping the slab of the external primary memory to a virtual address space of the client, wherein the client includes a virtual machine on a first physical machine, the external primary memory is allocated to the virtual machine and includes data accessed by the virtual machine from the first physical machine; and
    migrating the virtual machine from the first physical machine to a second physical machine without copying the data by accessing the data in the external primary memory by the virtual machine from the second physical machine.

* * * * *